US012136403B2

(12) United States Patent
Yamaguchi

(10) Patent No.: US 12,136,403 B2
(45) Date of Patent: Nov. 5, 2024

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 293 days.

(21) Appl. No.: 17/950,883

(22) Filed: Sep. 22, 2022

(65) Prior Publication Data

US 2023/0097634 A1 Mar. 30, 2023

(30) Foreign Application Priority Data

Sep. 30, 2021 (JP) ................................. 2021-161030
Sep. 30, 2021 (JP) ................................. 2021-161031

(51) Int. Cl.
*G10B 3/12* (2006.01)
*G10H 1/34* (2006.01)

(52) U.S. Cl.
CPC ................. *G10B 3/12* (2013.01); *G10H 1/34* (2013.01)

(58) Field of Classification Search
CPC .................................... G10B 3/12; G10H 1/34
See application file for complete search history.

(56) References Cited

U.S. PATENT DOCUMENTS

| | | | | |
|---|---|---|---|---|
| 8,766,075 B2 * | 7/2014 | Ishida | G10C 3/12 84/433 |
| 10,847,130 B2 * | 11/2020 | Terai | G10H 1/346 |
| 11,776,512 B2 * | 10/2023 | Kasubuchi | G10C 3/12 84/423 R |
| 2020/0090633 A1 * | 3/2020 | Terai | G10H 1/346 |
| 2022/0310050 A1 * | 9/2022 | Yamaguchi | G10H 1/346 |
| 2023/0097634 A1 * | 3/2023 | Yamaguchi | G10B 3/12 84/433 |
| 2023/0100217 A1 * | 3/2023 | Yamaguchi | G10H 1/346 84/644 |

(Continued)

FOREIGN PATENT DOCUMENTS

JP 2019056743 A * 4/2019
JP 2019056781 A * 4/2019

(Continued)

*Primary Examiner* — Robert W Horn
(74) *Attorney, Agent, or Firm* — LEWIS ROCA ROTHGERBER CHRISTIE LLP

(57) ABSTRACT

A keyboard device for a keyboard instrument includes a keyboard chassis, a key disposed on the keyboard chassis, and a key support mechanism which supports the key from below and causes the key to operate such that the key pivotally moves about a virtual pivot. One of a first arm rear-side connecting portion and a second arm front-side connecting portion includes an engagement shaft extending in a left-right direction, and the other of them includes an engagement recess which has a U shape in side view and open in one of a front direction and a rear direction and is engaged with the engagement shaft. A cushioning member in sliding contact with an inner surface of the engagement recess is mounted on the engagement shaft in a state covering an outer peripheral surface of the engagement shaft.

10 Claims, 15 Drawing Sheets

(56) References Cited

U.S. PATENT DOCUMENTS

| | | | | |
|---|---|---|---|---|
| 2023/0101297 | A1* | 3/2023 | Yamaguchi ............ | G10H 1/346 84/644 |
| 2023/0317034 | A1* | 10/2023 | Yamaguchi ............ | G10H 1/346 84/423 R |
| 2023/0317038 | A1* | 10/2023 | Yamaguchi ............ | G10H 1/344 84/423 R |
| 2023/0317040 | A1* | 10/2023 | Yamaguchi ............ | G10H 1/346 84/744 |
| 2024/0112651 | A1* | 4/2024 | Murai ...................... | G10C 3/18 |
| 2024/0112658 | A1* | 4/2024 | Kito ....................... | G10H 1/346 |

FOREIGN PATENT DOCUMENTS

| | | | | |
|---|---|---|---|---|
| JP | 2019061113 | A | * | 4/2019 |
| JP | 2020-052391 | A | | 4/2020 |
| JP | 6957282 | B2 | * | 11/2021 |
| JP | 6979836 | B2 | * | 12/2021 |

* cited by examiner

KEYBOARD DEVICE FOR KEYBOARD INSTRUMENT

CROSS-REFERENCE TO RELATED APPLICATIONS

This application claims priority to Japanese Patent Application Number 2021-161030, filed on Sep. 30, 2021, and Japanese Patent Application Number 2021-161031, filed on Sep. 30, 2021, the entire content of each of which is incorporated herein by reference.

BACKGROUND OF THE INVENTION

Field of the Invention

The present invention relates to a keyboard device which is applied to a keyboard instrument, such as an electronic piano, and in which a key having been depressed operates such that the key is pivotally moved about a virtual pivot located rearward of a rear end thereof.

Description of the Related Art

Conventionally, as this type of a keyboard device, there has been known, for example, one disclosed in Japanese Laid-Open Patent Publication (Kokai) No. 2020-52391 (FIGS. 3 to 5) already filed by the present applicant. This keyboard device includes a key extending in a front-rear direction and a linkage supporting the key from below. The linkage includes a front-side connecting link bar and a rear-side connecting link bar each extending a predetermined length in the front-rear direction, and a front end of the front-side connecting link bar is pivotally connected to a front portion of the key, whereas a rear end of the rear-side connecting link bar is pivotally connected to a rear end of the key. Further, each of the connecting link bars is pivotally supported via a support pin provided in the vicinity of a longitudinal center thereof. A rear end of the front-side connecting link bar and a front end of the rear-side connecting link bar are pivotally and slidably connected to each other. More specifically, a slot is formed at the rear end of the front-side connecting link bar, whereas a center connecting pin inserted through the slot is erected on the front end of the rear-side connecting link bar.

In the keyboard device constructed as described above, when the front end of the key is pressed down, each connecting link bar of the linkage is pivotally moved about its support pin in a predetermine direction. In this case, the center connecting pin of the rear-side connecting link bar slides in the slot of the front-side connecting link bar along a longitudinal direction thereof, while being pivotally moved. When the front end of the key is pressed down to its lowest position, the rear end of the key is positioned lower by a distance which is approximately half of a travel distance (key stroke) of the front end of the key. With this, the key operates such that it pivotally moves about a virtual pivot located rearward by almost the same length as the length of the key, and consequently it is possible to obtain the same key operation as that of a keyboard of an acoustic grand piano in spite of the key being configured such that it has a shorter length than that of the key of the acoustic grand piano.

In the above-described conventional keyboard device, the connecting link bars of the linkage are made of a hard material, such as a metal, and hence there is a fear that key operation cannot be properly performed depending on the relationship between the diameter of the center connecting pin of the rear-side connecting link bar and the lateral width of the slot of the front-side connecting link bar. More specifically, in a case where the diameter of the center connecting pin is smaller than the lateral width of the slot so that a relatively large gap is formed between the center connecting pin and a side surface of the slot in a direction of the width thereof, there is a fear that noise is generated by the center connecting pin hitting against the side surface of the slot during key depression. Contrary to the above, in a case where almost no such a gap is formed, the center connecting pin cannot slide smoothly in the slot, which sometimes makes touch feeling heavier when depressing the key. Therefore, this keyboard device has room for improvement.

Further, in the above-described conventional keyboard device, each connecting link bar of the linkage is pivotally supported in a state where the support pin, which has a circular cross-section, is inserted into a pin hole provided at about a longitudinal center of the connecting link bar. Further, a support portion having an upper portion formed in a bifurcated shape is erected on a base of the keyboard device, and opposite ends of the support pin are supported by bifurcated upper ends of the support portion, respectively.

In the keyboard device constructed as described above, when assembling the keyboard device, to pivotally engage each connecting link bar with the support pin, it is necessary to insert the support pin into the support portion and the connecting link bar after positioning the pin hole of the connecting link bar and the bifurcated upper ends of the support portion, which makes assembly work troublesome. Further, during maintenance of the keyboard device, if it is necessary to remove the connecting link bar from the support portion, the support pin is required to be drawn out from the connecting link bar. This work takes much time and labor. Thus, in the keyboard device, assembly work and maintenance work are troublesome and take much time and labor. Therefore, this keyboard device has room for improvement.

SUMMARY OF THE INVENTION

It is an object of the present invention to provide a keyboard device for a keyboard instrument, which is capable of not only preventing noise from being generated by key depression at a connecting portion between a first arm and a second arm of a key support mechanism but also ensuring smooth operation of the connecting portion, thereby providing excellent touch feeling.

It is another object of the present invention to provide a keyboard device for a keyboard instrument, which enables an arm to be easily engaged with and disengaged from a pivot shaft during assembly or maintenance of the keyboard device.

To attain the first-mentioned object, in a first aspect of the present invention, there is provided a keyboard device for a keyboard instrument, including a keyboard chassis, a key extending a predetermined length in a front-rear direction and disposed on the keyboard chassis, and a key support mechanism engaged with the keyboard chassis and provided so as to support the key from below, the key support mechanism causing, upon depression of the key, the depressed key to operate such that the key pivotally moves about a virtual pivot located rearward of a rear end of the key, wherein the key support mechanism includes a first arm configured to extend a predetermined length in the front-rear direction and be swingably engaged with a first pivot shaft provided on the keyboard chassis, the first arm having a front end pivotally and slidably connected to a front portion of the key, and a second arm configured to extend a predetermined length in the front-rear direction and be swingably engaged with a second pivot shaft provided on the keyboard chassis at a location rearward of the first pivot shaft, the second arm having a rear end pivotally connected to a rear portion of the key, and including a second arm front-side connecting portion which is disposed forward of the second pivot shaft and is pivotally and slidably connected to a first arm rear-side connecting portion rearward of the first pivot shaft of the first arm, wherein one of the first arm rear-side connecting portion and the second arm front-side connecting portion includes an engagement shaft extending in a left-right direction, wherein the other of the first arm rear-side connecting portion and the second arm front-side connecting portion includes an engagement recess engaged with the engagement shaft, and wherein a cushioning member in sliding contact with an inner surface of the engagement recess is mounted on the engagement shaft in a state covering an outer peripheral surface of the engagement shaft.

With the construction of the first aspect of the present invention, the key, which extends the predetermined length in the front-rear direction and is disposed on the keyboard chassis, is supported by the key support mechanism having the above-described first arm and second arm from below, and when depressed, is caused to operate such that the key is pivotally moved about the virtual pivot located rearward of the rear end of the key. Further, in the key support mechanism, the first arm rear-side connecting portion of the first arm and the second arm front-side connecting portion of the second arm are pivotally and slidably connected. One of the first arm rear-side connecting portion and the second arm front-side connecting portion includes the engagement shaft, and the other thereof includes the engagement recess. The cushioning member in sliding contact with the inner surface of the engagement recess is mounted on the engagement shaft in the state covering the outer peripheral surface of the engagement shaft. As described above, since the cushioning member is mounted on the engagement shaft, the engagement shaft is prevented from directly hitting against the inner surface of the engagement recess, and therefore it is possible to prevent noise from being generated by depression of the key at the connecting portion between the first arm and the second arm of the key support mechanism. Further, since the cushioning member mounted on the engagement shaft is in sliding contact with the engagement recess, it is possible to ensure smooth operation of the connecting portion between the first arm and the second arm, whereby it is possible to obtain excellent touch feeling by the key depression.

Preferably, the engagement shaft is formed by a left protrusion and a right protrusion protruding toward a left side and a right side, respectively, and the cushioning member is formed as a molded article made of an elastic synthetic resin, the cushioning member including a left cylindrical portion which is formed in a hollow cylindrical shape and into which the left protrusion is fitted, a right cylindrical portion which is formed in a hollow cylindrical shape and into which the right protrusion is fitted, and a connecting portion provided such that the connecting portion connects a right-side end surface of the left cylindrical portion and a left-side end surface of the right cylindrical portion.

With the construction of this preferred embodiment, since the cushioning member is formed as the molded article made of the elastic synthetic resin, the cushioning member can be easily manufactured at relatively low costs. Further, when the cushioning member is mounted on the engagement shaft, one of the left and right cylindrical portions of the cushioning member is fitted on one of the left and right protrusions of the engagement shaft, and the other of the cylindrical portions is fitted on the other of the protrusions, by pulling the other. Thus, the cushioning member can be relatively easily mounted on the engagement shaft.

More preferably, lubricant holding portions each formed in a concave shape open outward for holding a lubricant are formed in respective outer peripheral surfaces of the left cylindrical portion and the right cylindrical portion.

With the construction of this preferred embodiment, since the lubricant holding portions each formed in the concave shape open outward are formed in the respective outer peripheral surfaces of the left cylindrical portion and the right cylindrical portion of the cushioning member, by applying the lubricant to the cushioning member mounted on the engagement shaft, the lubricant can be held on the outer peripheral surfaces of the left cylindrical portion and the right cylindrical portion over a long time period. This makes it possible to ensure smooth operation of the connecting portion between the first arm and the second arm by the engagement shaft and the engagement recesses.

More preferably, at least one of the left cylindrical portion and the right cylindrical portion includes a cutoff portion formed by cutting off the cylindrical portion along a longitudinal direction thereof.

With the construction of this preferred embodiment, since the at least one of the left cylindrical portion and the right cylindrical portion of the cushioning member includes the cutoff portion formed by cutting off the cylindrical portion along the longitudinal direction thereof, the cushioning member is mounted on the engagement shaft as follows: For example, in a case where only one of the left cylindrical portion and the right cylindrical portion includes the cutoff portion, one of the left and right cylindrical portions, which does not include the cutoff portion, is fitted on one of the left and right protrusions of the engagement shaft, and then the other cylindrical portion including the cutoff portion is fitted on the other of the left and right protrusions via the cutoff portion. With this, compared with a cushioning member not including the cutoff portion, the cushioning member including the cutoff portion can be more easily mounted on the engagement shaft without pulling the same. Further, in a case where both of the left and right cylindrical portions include the cutoff portions, by fitting the cylindrical portions on respective associated engagement shafts via the cutoff portions, it is possible to mount the cushioning member on the engagement shaft further more easily.

Preferably, at least one of the inner surface of the engagement recess and an outer peripheral surface of the cushioning member is provided with a let-off protrusion formed in a protruding shape protruding outward, the let-off protrusion temporarily hindering sliding of the engagement shaft inside the engagement recess caused by key depression, for adding let-off feeling to touch feeling of the depressed key.

With the construction of this preferred embodiment, the at least one of the inner surface of the engagement recess and the outer peripheral surface of the cushioning member is provided with the let-off protrusion formed in the protruding shape protruding outward. When the engagement shaft slides in the engagement recess in accordance with depression of the key, the sliding is temporarily hindered by the let-off protrusion. With this, click feeling due to temporary resistance is generated on the depressed key, whereby it is possible to obtain touch feeling analogous to let-off of an acoustic piano.

To attain the second-mentioned object, in a second aspect of the present invention, there is provided a keyboard device for a keyboard instrument, including a keyboard chassis, a key extending a predetermined length in a front-rear direction and disposed on the keyboard chassis, and a key support mechanism engaged with the keyboard chassis and provided so as to support the key from below, the key support mechanism causing, upon depression of the key, the depressed key to operate such that the key pivotally moves about a virtual pivot located rearward of a rear end of the key, wherein the key support mechanism includes an arm configured to extend a predetermined length in the front-rear direction, the arm being pivotally engaged with a pivot shaft provided on the keyboard chassis and extending in the left-right direction, and having one end engaged with the key, and wherein the arm includes a bearing portion via which, when the arm is engaged with and disengaged from the pivot shaft during assembly or maintenance of the keyboard device, the arm can be mounted on the pivot shaft from above the keyboard chassis and can be removed from the pivot shaft upward of the keyboard chassis, while being held in a predetermined posture.

With the construction of the second aspect of the present invention, the key extending in the front-rear direction is supported from below by the key support mechanism such that the key is pivotally moved about the virtual pivot located rearward of the rear end of the key. Further, the key support mechanism includes the arm pivotally engaged with the pivot shaft provided on the keyboard chassis. This arm is provided with a predetermined bearing portion engaged with the pivot shaft. During assembly or maintenance of the keyboard device, when the arm is engaged with and disengaged from the pivot shaft via the bearing portion, the arm can be mounted on the pivot shaft from above the keyboard chassis and be removed therefrom upward of the keyboard chassis while being held in the predetermined posture. With this, during assembly or maintenance of the keyboard device, the arm can be easily engaged with and disengaged from the pivot shaft.

Preferably, an outer peripheral surface of the pivot shaft includes a pair of curved surfaces formed in an arcuate shape convex outward and opposed to each other with a predetermined spacing therebetween, and a pair of planar surfaces having ends continuous with ends of the pair of curved surfaces and parallelly opposed to each other with a predetermined spacing therebetween which is shorter than a distance between the pair of curved surfaces, and the bearing portion has an opening open toward a front end of the arm, and with an opening dimension of the opening being set to be shorter than a distance between respective vertices of the pair of curved surfaces and longer than a distance between the pair of planar surfaces.

With the construction of this preferred embodiment, the pivot shaft of the keyboard chassis has the outer peripheral surface thereof formed by the pair of curved surfaces and the pair of planar surfaces, whereby the pivot shaft is formed in a so-called oval shape in transverse cross-section. On the other hand, the bearing portion of the arm has the opening open toward the front end of the arm. The opening dimension of this opening is set to be shorter than the distance between the vertices of the pair of curved surfaces and longer than the distance between the pair of planar surfaces.

When the arm is mounted on the pivot shaft, the posture of the arm is held such that the opening of the bearing portion faces the curved surfaces of the pivot shaft, and the bearing portion is brought close to the pivot shaft for engagement therewith. As described above, the arm can be easily mounted on the pivot shaft via the bearing portion. On the other hand, when the arm is removed from the pivot shaft, the arm is held in the same posture as when mounted on the pivot shaft, whereby the opening of the bearing portion is adjusted to the curved surface of the pivot shaft, and the arm is pulled up. Thus, the arm can be easily removed from the pivot shaft. As described above, the arm including the above-described bearing portion can be easily engaged with and disengaged from the pivot shaft having the outer peripheral surface described above.

More preferably, the pivot shaft is set such that a long axis thereof, which passes through a shaft axis thereof and extends along a direction in which the pair of curved surfaces are opposed to each other, is positioned between a front-side inclined axis inclined forward through a predetermined angle with respect to a vertical line and a rear-side inclined axis inclined rearward through a predetermined angle with respect to the vertical line.

With the construction of this preferred embodiment, by appropriately setting the above-mentioned front-side inclined axis and rear-side inclined axis, and setting the pivot shaft such that the long axis thereof is located between the front-side inclined axis and the rear-side inclined axis, with respect to the vertical line, it is possible to prevent the arm from being removed from the pivot shaft during musical performance or transport of the keyboard device, while ensuring easy engagement and disengagement of the arm with and from the pivot shaft during assembly or maintenance of the keyboard device.

Further preferably, the predetermined angle is 45 degrees.

With the construction of this preferred embodiment, by setting the long axis of the pivot shaft such that the front-side inclined axis is inclined forward through 45 degrees with respect to the vertical line and the rear-side inclined axis is inclined rearward through 45 degrees with respect to the vertical line, and that the long axis of the pivot shaft is positioned between these axes, it is possible to stably obtain the operations and effects as described above.

More preferably, the bearing portion is provided at about a longitudinal center of the arm and at an upper portion of the arm.

With the construction of this preferred embodiment, when the arm is manually mounted on and removed from the pivot shaft of the keyboard chassis, the bearing portion of the arm can be visually recognized from above relatively easily, whereby it is possible to efficiently perform the work for mounting and removing the arm while confirming the location of the opening of the bearing portion and the pivot shaft.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 8A and 8B are views useful in explaining an essential part of a first aspect of the present invention, in which FIG. 8A shows a state in which a white key and a key support mechanism therefor are connected, and FIG. 8B shows a state in which a connection between a first arm and a second arm of the key support mechanism is disconnected and a cushioning member is removed from the first arm;

FIGS. 13A and 13B are views similar to FIG. 12, in which FIG. 13A shows a key-released state and FIG. 13B shows a key-depressed state;

FIGS. 14A and 14B are views useful in explaining an essential part of a second aspect of the present invention, in which FIG. 14A is a side cross-sectional view of the keyboard chassis in a state in which the second arm is supported on an associated one of second pivot shafts of the keyboard chassis, and FIG. 14B shows the second pivot shaft and components therearound on an enlarged scale;

FIGS. 15A and 15B are enlarged views useful in explaining shapes and sizes of the second pivot shaft and a bearing portion of the second arm, in which FIG. 15A shows the second pivot shaft and FIG. 15B shows the bearing portion of the second arm;

FIGS. 16A and 16B are views useful in explaining mounting of the second arm on the second pivot shaft of the keyboard chassis, in which FIG. 16A is a side cross-sectional view of the keyboard chassis when mounting the second arm, and FIG. 16B shows the second pivot shaft and components therearound on an enlarged scale;

FIGS. 18A and 18B are views useful in explaining an inclination range of a long axis of a cross-section of the second pivot shaft, in which FIG. 18A shows a state in which the long axis of the cross-section of the second pivot shaft is inclined rearward, and FIG. 18B shows a state in which the long axis of the cross-section of the second pivot shaft is inclined forward.

DETAILED DESCRIPTION OF PREFERRED EMBODIMENTS

Figure 1A:
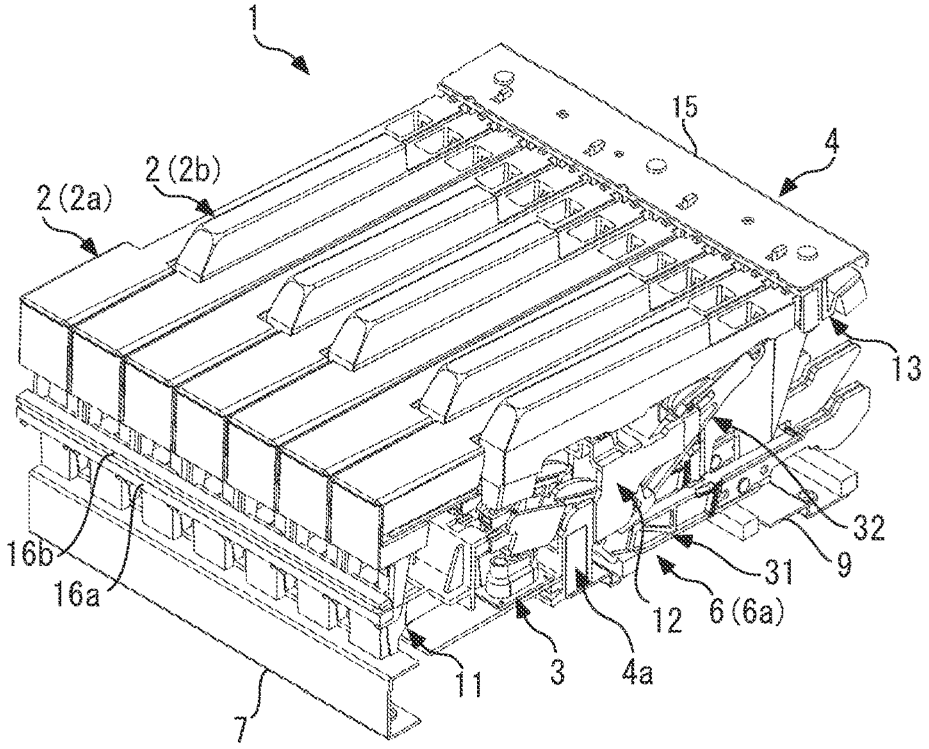

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic construction of the keyboard device 1 and operation thereof, and then of an essential part of a first aspect and an essential part of a second aspect of the present invention.

Figure 1B:
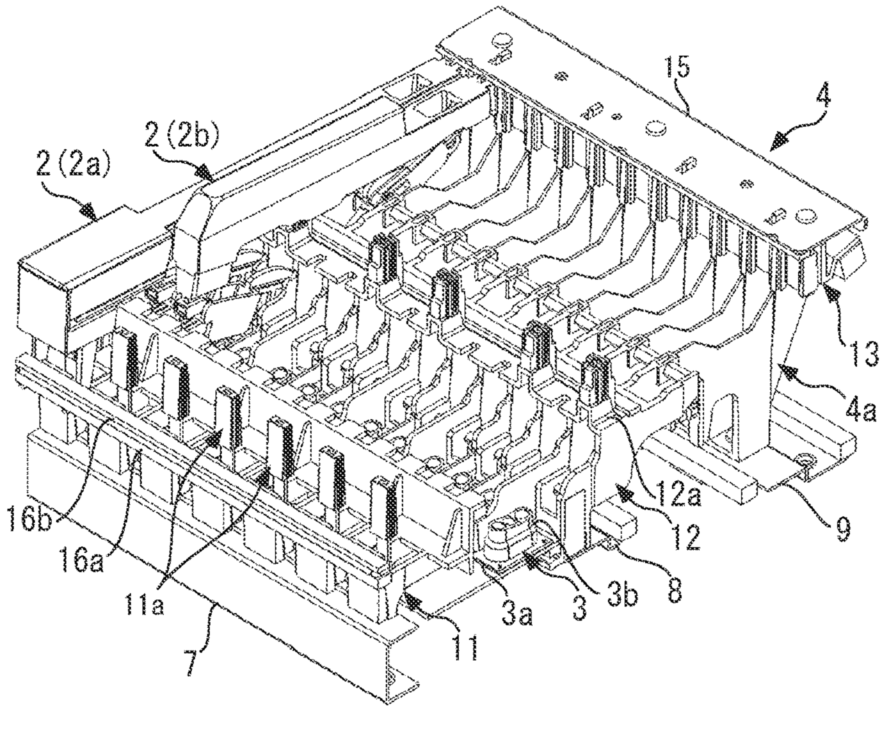
Figure 2:
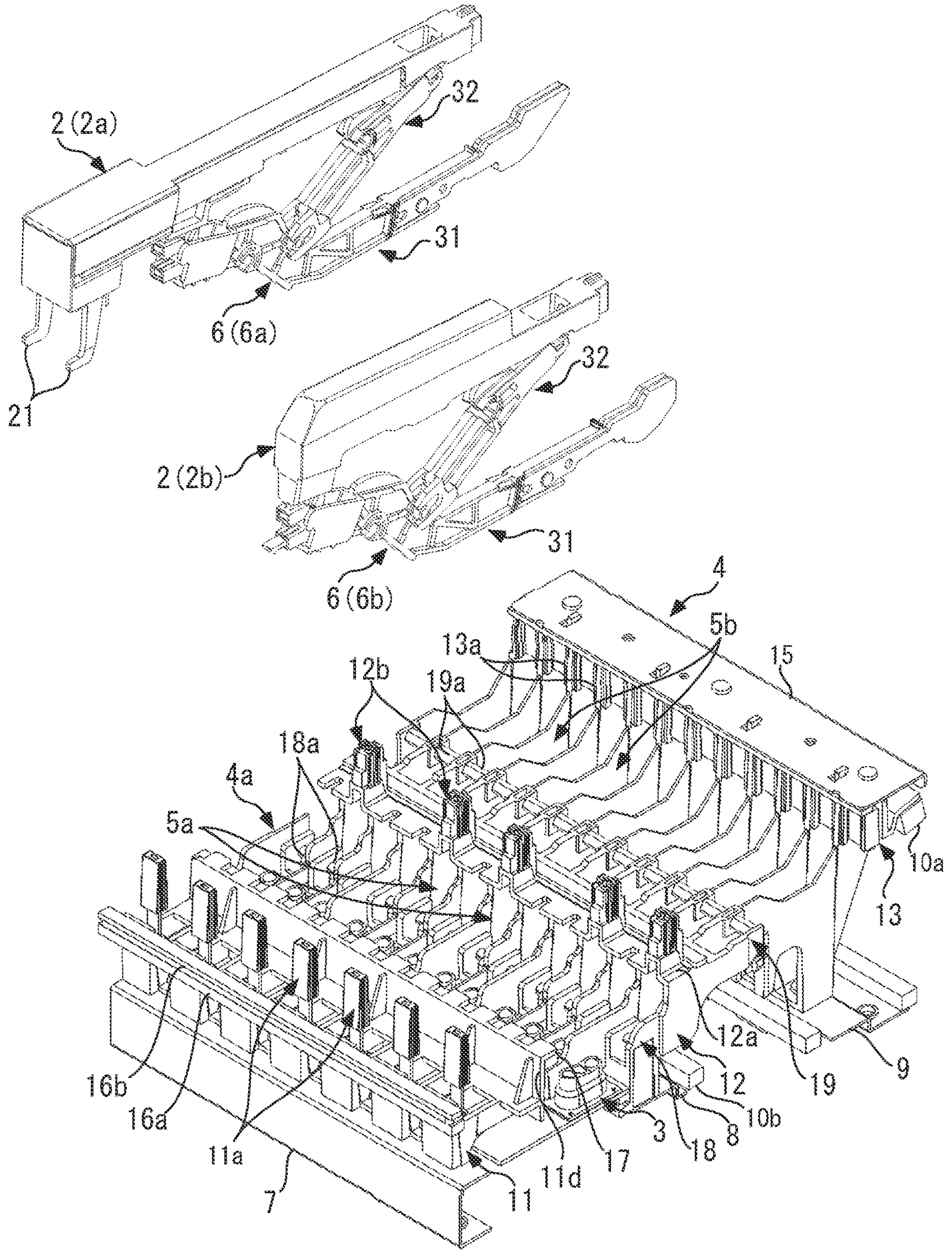
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state of the keyboard device 1 shown in FIG. 1B, in which the white key 2*a* and the black key 2*b* are removed, together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged in a state arranged side by side in a left-right direction, the plurality of key support mechanisms 6 each pivotally mounted on the keyboard chassis 4, for supporting an associated one of the keys 2 from below, and key switches 3 each for detecting key depression information of an associated one of the keys 2.

Figure 3A:
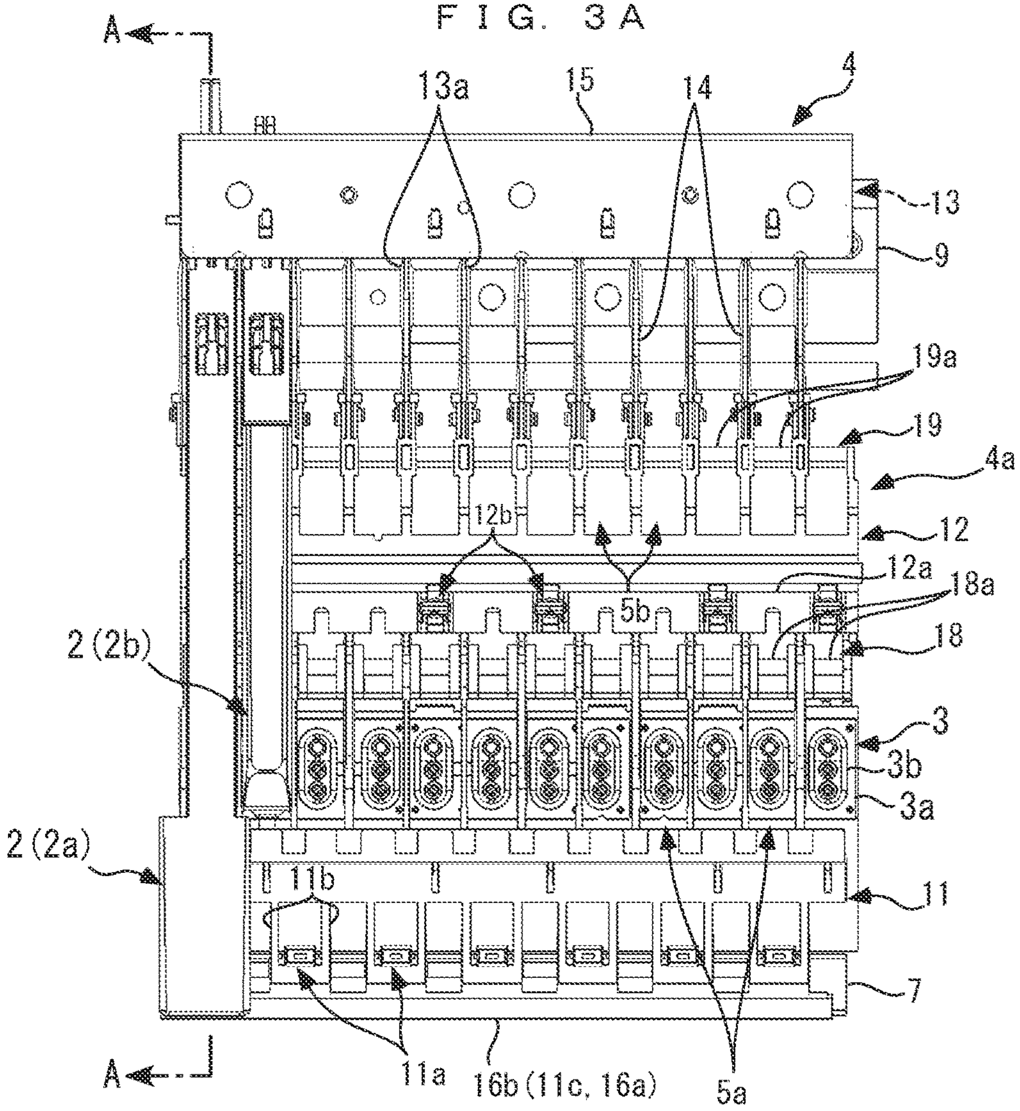
FIG. 3A is a plan view of the keyboard device shown in FIG. 1B
Figure 3B:
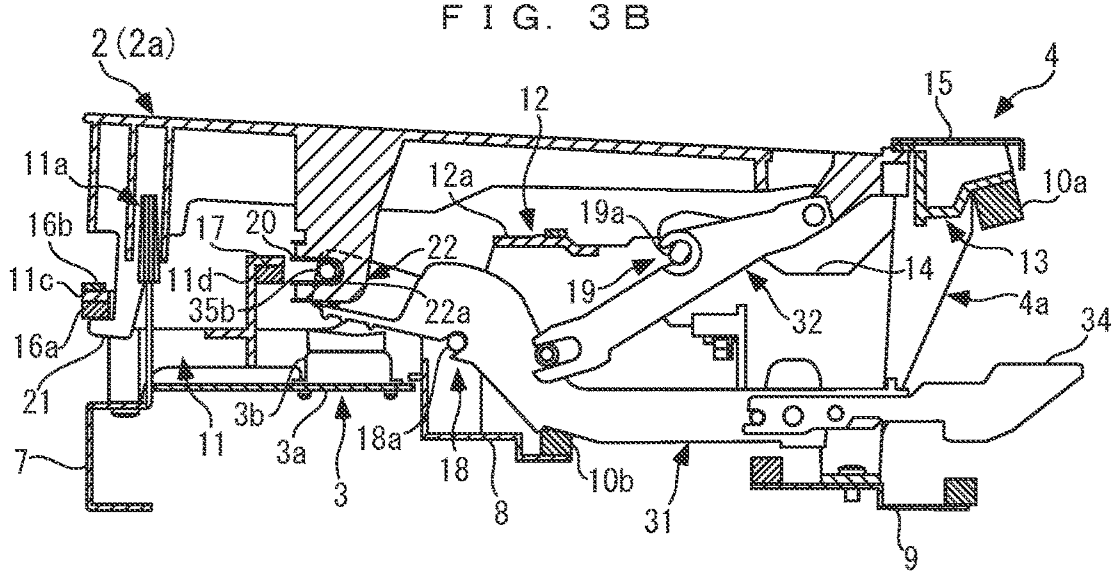
FIG. 3B is a cross-sectional view taken along line A-A of FIG. 3A.

The keyboard chassis 4 includes a chassis body 4*a* formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other via a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other so as to be arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
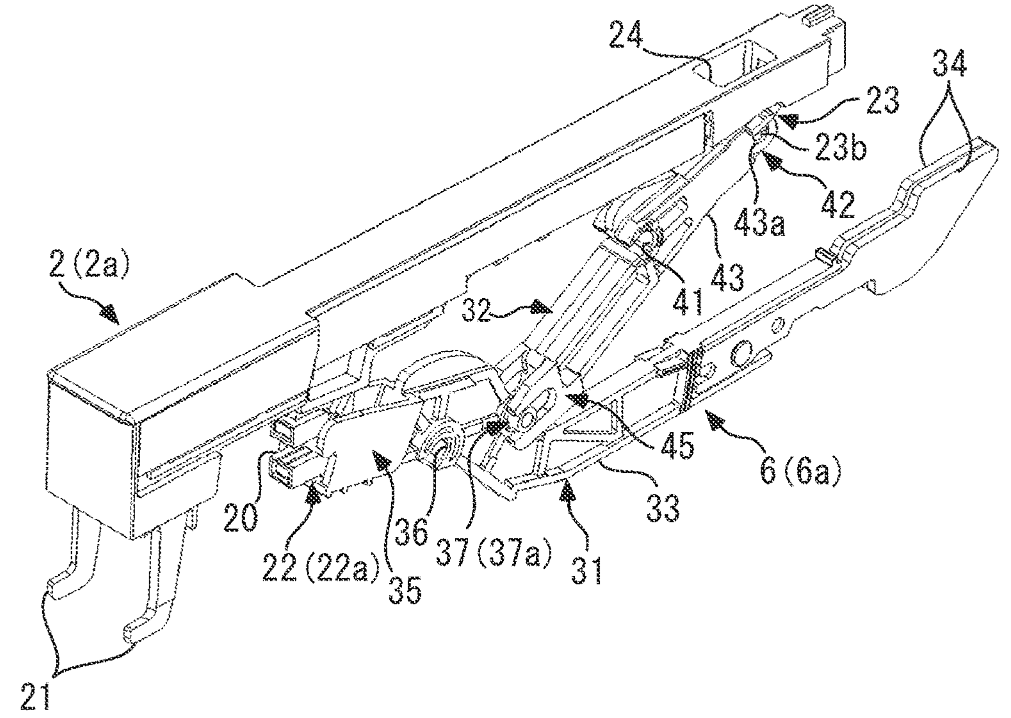
Figure 4B:
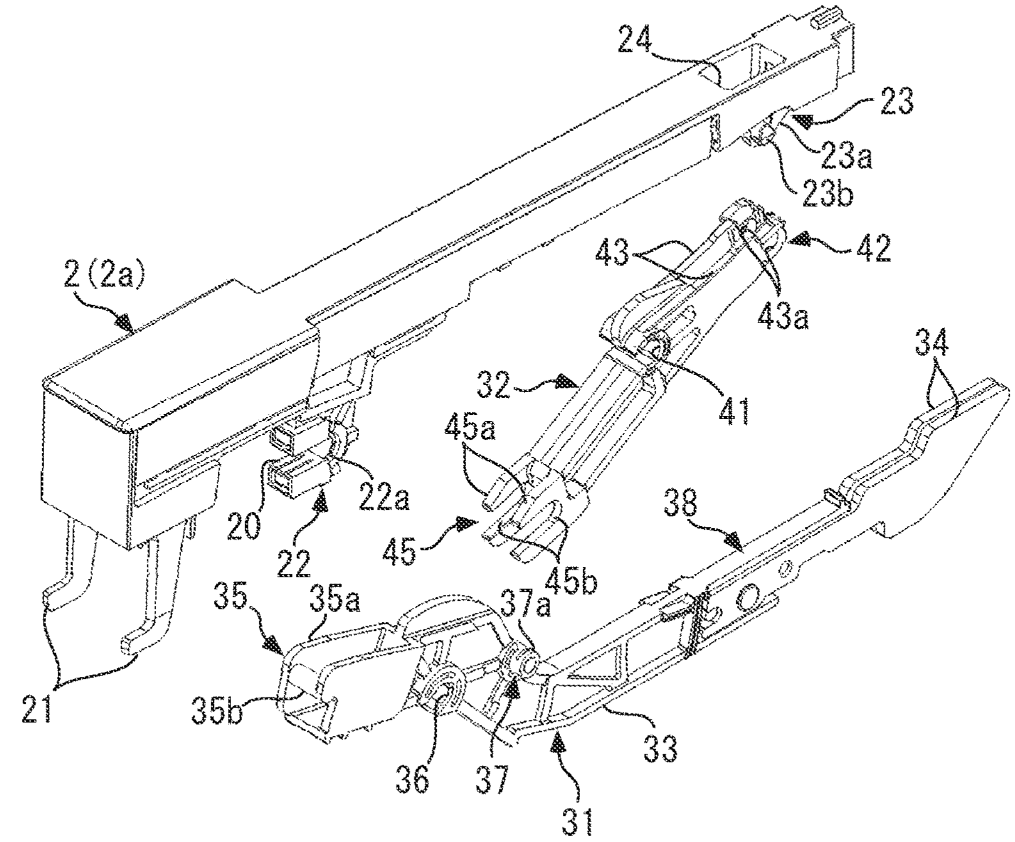

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess (engagement recess) 22*a* which has a U shape having a slot-like shape in side view and open forward. Further, the connecting recess 22*a* has a key-side noise suppressing member 20 attached thereto, which is formed to cover the whole inner peripheral surface of the connecting recess 22*a*, for suppressing generation of noise when a connecting shaft 35*b*, referred to hereinafter, of the first arm 31 slides in the inner peripheral surface of the connecting recess 22*a*.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, a rear portion of the white key 2*a* is formed with a tool insertion hole 24 which vertically extends through the rear portion, and is used to insert a predetermined tool from above for disconnecting the white key 2*a* from the second arm 32 of the key support mechanism 6*a* e.g. for maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
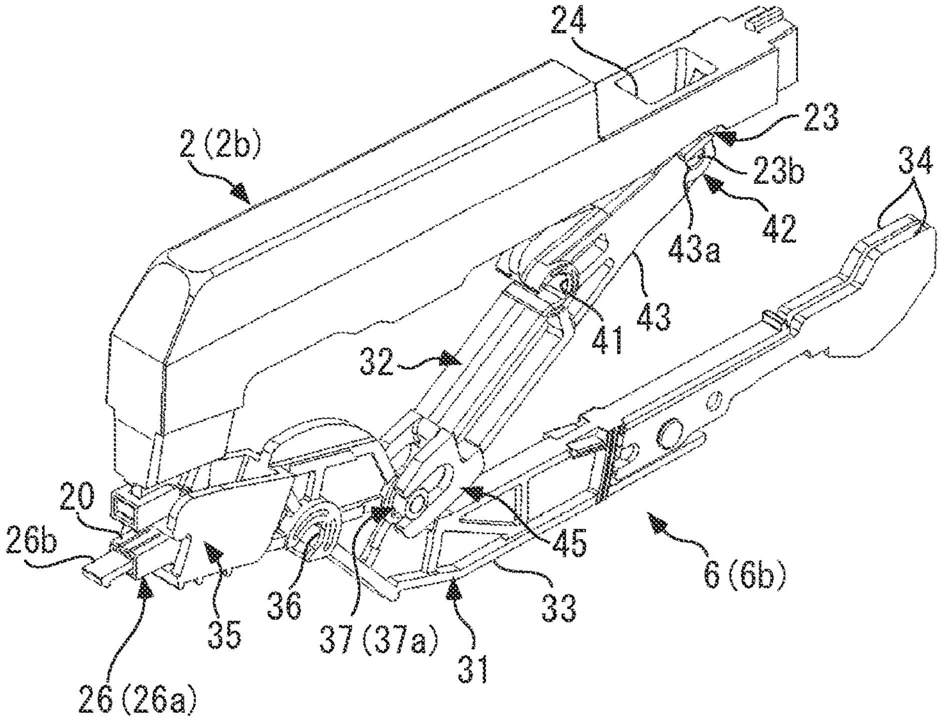
Figure 5B:
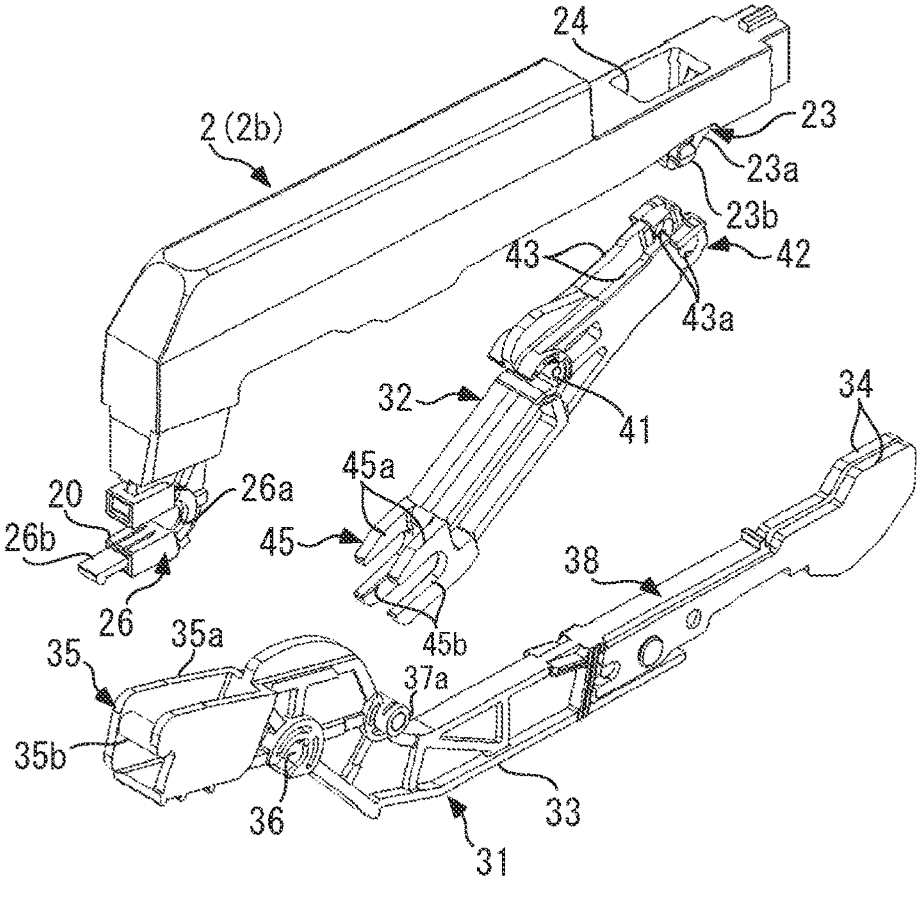

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess (engagement recess) 26*a* which has a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that two left and right weights 34 and 34 of the black key-associated key support mechanism 6*b* differ from the weights 34 of the white key-associated key support mechanism 6*a* in the shape of the rear portion thereof.

Figure 6A:
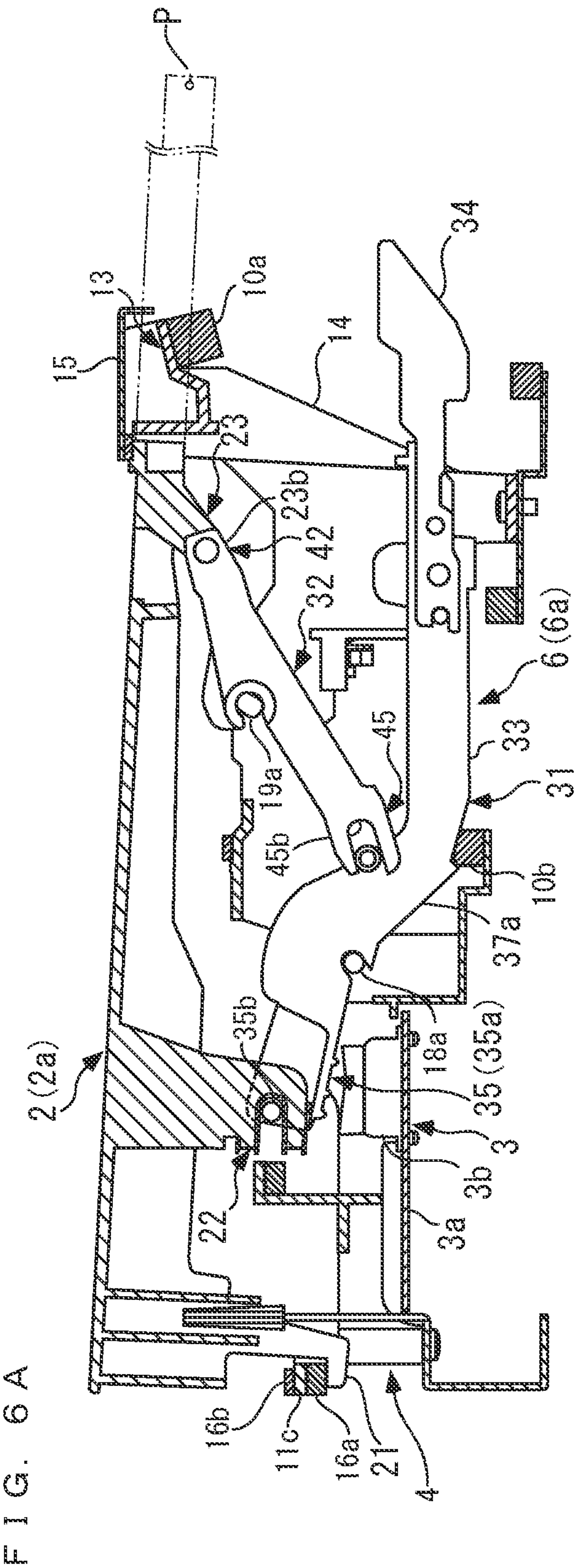
Figure 6B:
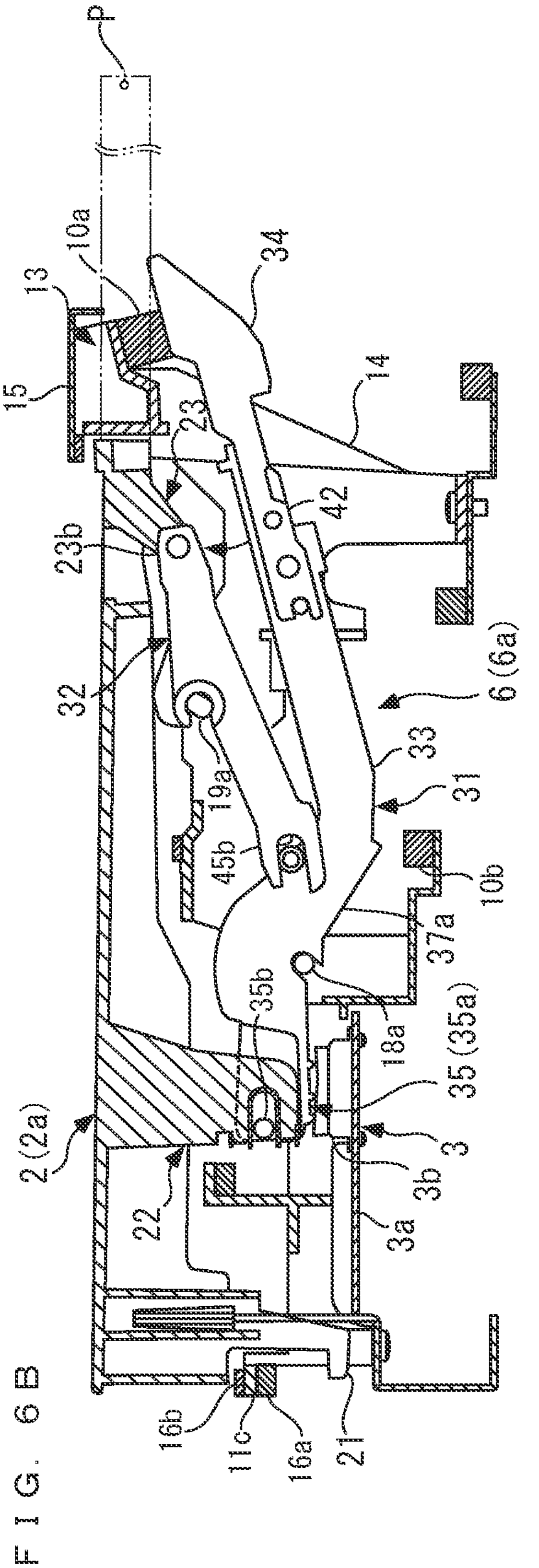
Figure 7A:
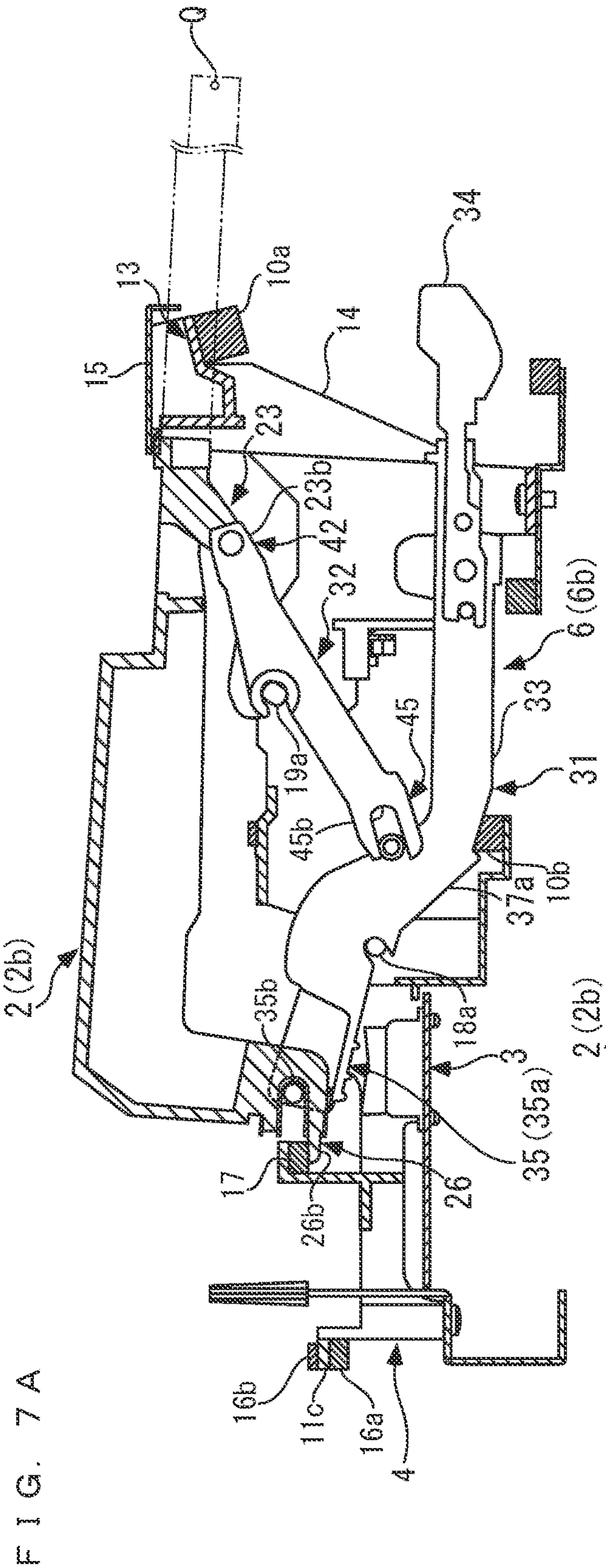
Figure 7B:
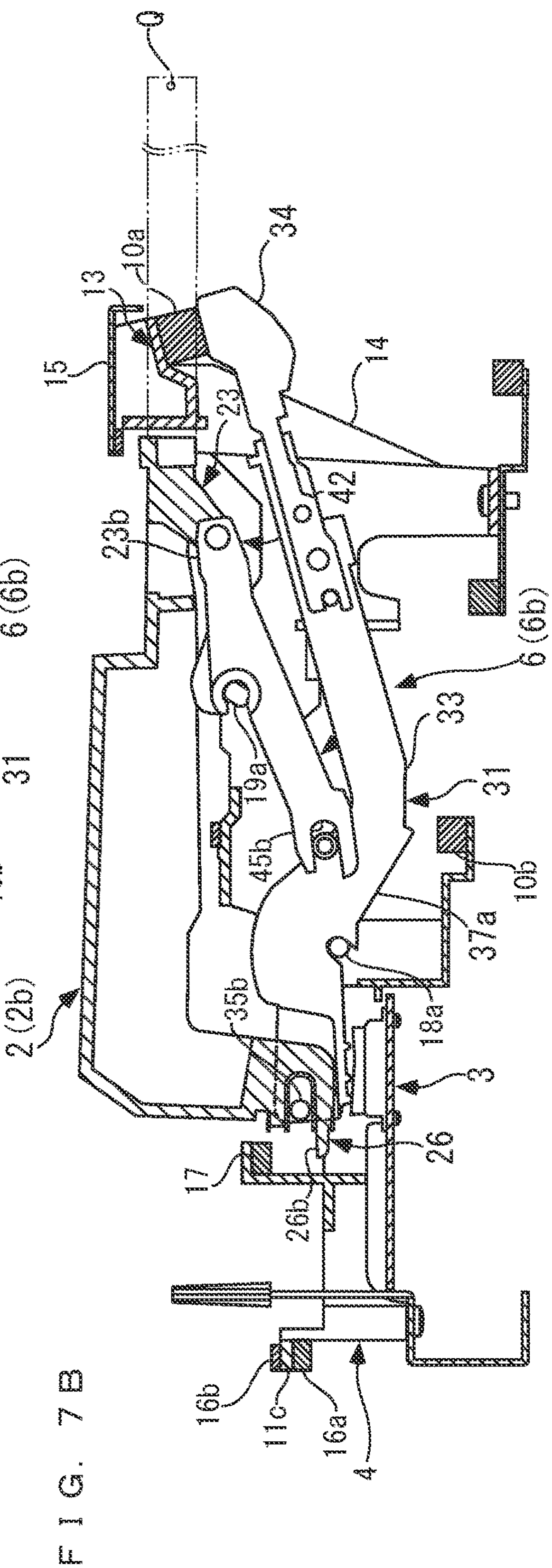

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* is moved downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, is moved upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 is moved downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is tilted such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* becomes approximately twice as long as the length of the white key 2*a* itself, for example. With this, when the front end of the white key 2*a* is depressed to the lowest position, compared with the case where the white key 2*a* is in the key-released state shown in FIG. 6A, the front end of the white key 2*a* is positioned lower by a predetermined key stroke (e.g. 10 mm) and the rear end of the white key 2*a* is located lower by a distance (e.g. 5 mm) which is approximately half of the above key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked and the white key 2*a* returns to its original key-released state.

Further, operation in response to depression of the black key 2*b* is performed similar to the above-described operations of the white key 2*a* and the key support mechanism 6*a* in response to depression of the white key 2*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* operates such that it pivotally moves about a virtual pivot Q located rearward of the rear end thereof. Note that similar to the above-mentioned virtual pivot P of the white key 2*a*, the location of the virtual pivot Q is set such that a distance from the front end of the black key 2*b* becomes approximately twice as long as the length of the black key 2*b* itself, for example. Therefore, when the front end of the black key 2*b* is depressed to its lowest position, compared with a case where the black key 2*b* is in the key-released state shown in FIG. 7A, the front end of the black key 2*b* is positioned lower by a predetermined key stroke and the rear end thereof is positioned lower by a distance which is approximately half of the above key stroke.

On the other hand, when the finger is released from the black key 2*b* having been depressed, the first arm 31 and the second arm 32 of the key support mechanism 6*b* pivotally move in respective directions opposite to the above-mentioned directions, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the first aspect of the present invention will be described with reference to FIGS. 8A to 13B. The essential part of the first aspect of the present invention is that the first arm 31 of the key support mechanism 6 has a cushioning member 51 provided on an outer peripheral surface of the connecting shaft 37*a* of the first arm rear-side connecting portion 37, which is a connecting portion between the first arm 31 and the second arm 32. Note that in the following description, the connecting shaft 37*a*, which is integrally formed with the arm body 33 of the first arm 31, will be referred to as "the connecting shaft 50".

Figure 8A:
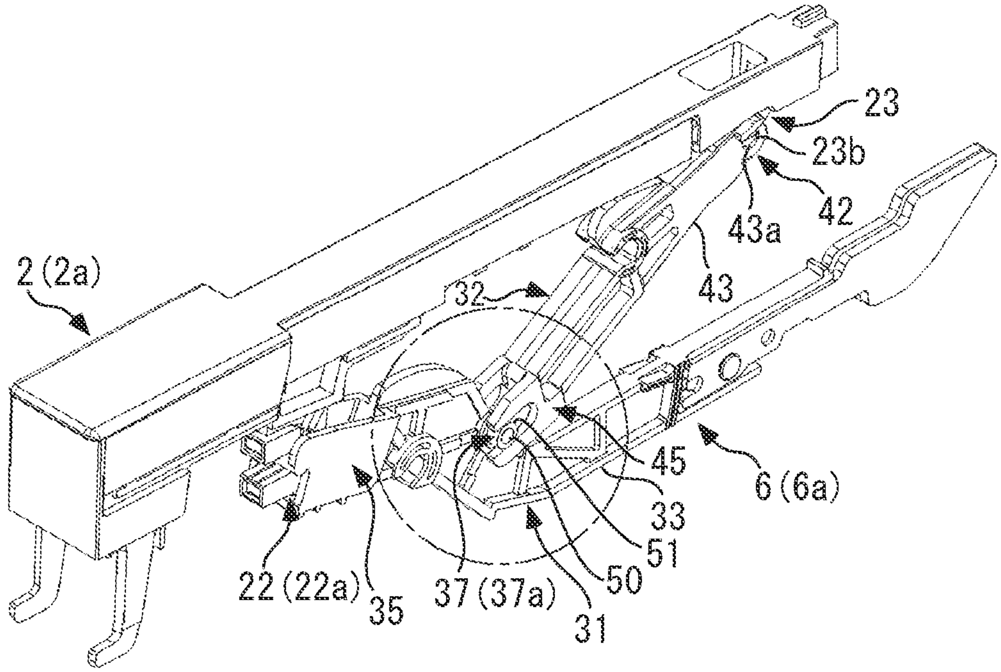
Figure 8B:
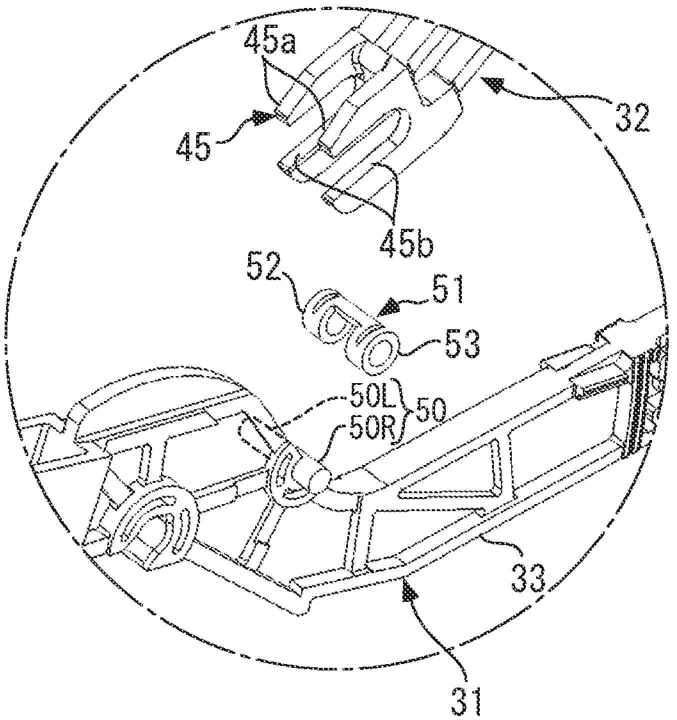

FIG. 8A shows the white key 2*a* and the key support mechanism 6*a* therefor, and FIG. 8B shows a state in which the connection between the first arm 31 and the second arm 32 of the key support mechanism 6*a* is disconnected and the cushioning member 51 is removed from the connecting shaft 50 of the first arm 31. As shown in FIG. 8B, the connecting shaft 50 (engagement shaft) is comprised of a left protrusion 50L and a right protrusion 50R which protrude leftward and rightward by the same predetermined length from the arm body 33, respectively. These protrusions 50R and 50L are disposed along the same straight line extending in the left-right direction and have a circular cross-section with a predetermined diameter.

Figure 9A:
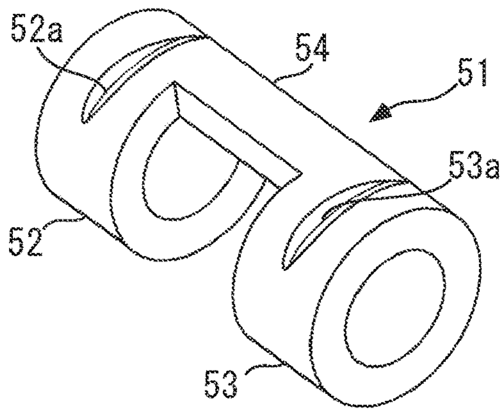
FIGS. 9A to 9C are a perspective view, a front view, and a side view showing the cushioning member on an enlarged scale, respectively.
Figure 9B:
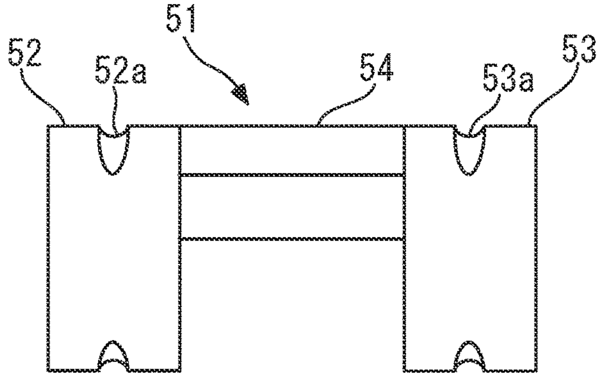
Figure 9C:
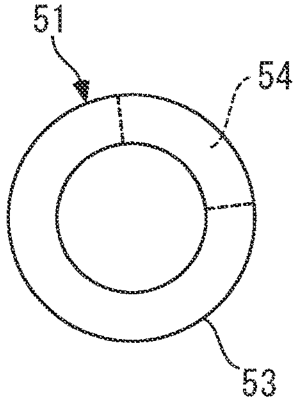

FIGS. 9A to 9C show the cushioning member 51 on an enlarged scale. This cushioning member 51 is formed as a molded article made of a predetermined elastic synthetic resin (e.g. thermoplastic elastomer), and includes a left cylindrical portion 52 and a right cylindrical portion 53 which are both formed in the same hollow cylindrical shape and are arranged in the left-right direction with a predetermined spacing therebetween, and a connecting portion 54 provided such that the connecting portion 54 connects these cylindrical portions 52 and 53. The left cylindrical portion 52 and the right cylindrical portion 53 have approximately the same length and inner diameter as the protruding length and the diameter of each of the protrusions 50L and 50R of the connecting shaft 50, and are formed in a thick hollow cylindrical shape with a predetermined thickness. Further, the left cylindrical portion 52 and the right cylindrical portion 53 have outer peripheral surfaces thereof provided with respective lubricant holding portions 52*a* and 53*a* each formed in a concave shape open outward.

On the other hand, the connecting portion 54 has an arcuate shape in transverse cross-section and formed such that respective portions, each corresponding to approximately one-fourth of circumference, of a right-side end surface of the left cylindrical portion 52 and a left-side end surface of the right cylindrical portion 53 are continuous with the connecting portion 54.

The cushioning member 51 constructed as described above is mounted on the connecting shaft 50 in a state in which the left cylindrical portion 52 is fitted on the left protrusion 50L of the connecting shaft 50 and the right cylindrical portion 53 is fitted on the right protrusion 50R of the connecting shaft 50. Note that when mounting the cushioning member 51 on the connecting shaft 50, one of the left and right cylindrical portions 52 and 53 is fitted on one of the left and right protrusions 50L and 50R of the connecting shaft 50, and the other of the cylindrical portions 52 and 53 is fitted on the other of the protrusions 50L and 50R, by pulling the other. Thus, the cushioning member 51 can be relatively easily mounted on the connecting shaft 50.

As described above, according to the keyboard device 1 to which the essential part of the first aspect of the present invention is applied, the cushioning member 51 is mounted on the connecting shaft 50 of the first arm 31 in a state covering an outer peripheral surface of the connecting shaft 50, and the left and right cylindrical portions 52 and 53 of the cushioning member 51 are brought into sliding contact with inner surfaces of the connecting recesses 45*b* and 45*b* (engagement recesses) of the left and right connecting portions 45*a* and 45*a* of the second arm 32. With this, the connecting shaft 50 of the first arm 31 is prevented from directly hitting against the respective inner surfaces of the connecting recesses 45*b* of the second arm 32, and therefore, upon key depression, it is possible to prevent generation of noise at the connecting portion between the first arm 31 and the second arm 32 of the key support mechanism 6. Further, it is possible to ensure smooth operation of the connecting portion between the first arm 31 and the second arm 32 to thereby obtain excellent touch feeling when key depression is performed.

Further, since the lubricant holding portions 52*a* and 53*a* each formed in the concave shape are provided in the respective outer peripheral surfaces of the left cylindrical portion 52 and the right cylindrical portion 53 of the cushioning member 51, by applying a lubricant to the cushioning member 51 mounted on the connecting shaft 50, it is possible to hold the lubricant on the outer peripheral surfaces of the left cylindrical portion 52 and the right cylindrical portion 53 over a long time period. This makes it possible to ensure smooth operation of the connecting portion between the first arm 31 and the second arm 32, which is formed by the connecting shaft 50 and the connecting recesses 45*b*.

Figure 10:
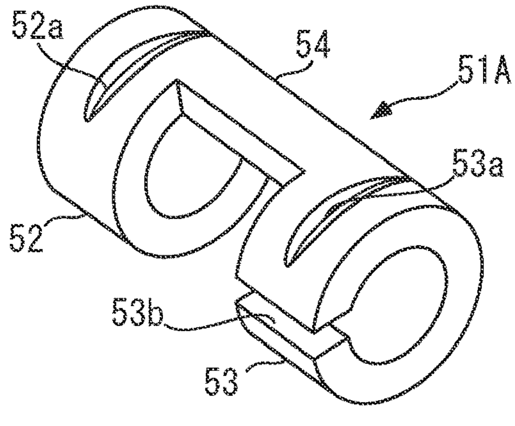
FIG. 10 is a perspective view of a variation of the cushioning member.

FIG. 10 is a perspective view showing a variation of the cushioning member 51. As shown in FIG. 10, this cushioning member 51A is different from the above-described cushioning member 51 only in that a cutoff portion 53*b* is formed in the right cylindrical portion 53. The cutoff portion 53*b* is formed by cutting off the right cylindrical portion 53 along a longitudinal direction thereof. When mounting the cushioning member 51A including the cutoff portion 53*b* thus formed on the connecting shaft 50, the left cylindrical portion 52 without a cutoff portion is fitted on the left protrusion 50L of the connecting shaft 50, and then the right cylindrical portion 53 including the cutoff portion 53*b* is fitted on the right protrusion 50R via the cutoff portion 53*b*, specifically, by widening the cutoff portion 53*b*. With this, compared with the cushioning member 51 described above, the cushioning member 51A including the cutoff portion 53*b* can be more easily mounted on the connecting shaft 50 without pulling the same outward. Note that although in FIG. 10, the cutoff portion 53*b* is formed only in the right cylindrical portion 53, the same cutoff portion may be also formed in the left cylindrical portion 52. In this case, by fitting the left and right cylindrical portions 52 and 53 on the left and right protrusion 50L and 50R of the connecting shaft 50 via the cutoff portions thereof, it is possible to mount the cushioning member 51 on the connecting shaft 50 further more easily.

Figure 11A:
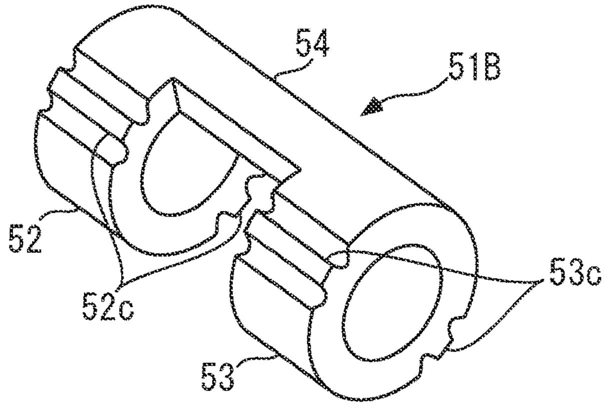
FIGS. 11A and 11B are a perspective view and a side view showing the cushioning member for adding let-off feeling to touch feeling of a key having been depressed, respectively.
Figure 11B:
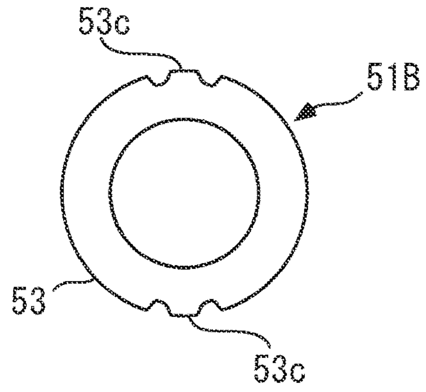

FIGS. 11A and 11B are a perspective view and a side view showing another variation of the cushioning member 51, respectively. This cushioning member 51B is provided for adding let-off feeling to touch feeling of a key 2 having been depressed, in cooperation with the connecting recesses 45*b* of the second arm 32.

Specifically, as shown in FIGS. 11A and 11B, on the outer peripheral surface of the left cylindrical portion 52 of the cushioning member 51B, there are formed two let-off protrusions 52*c* and 52*c* at predetermined locations symmetrical to each other. Similarly, two let-off protrusions 53*c* and 53*c* are formed also on the outer peripheral surface of the right cylindrical portion 53 of the cushioning member 51B. The let-off protrusions 52*c* and 53*c* each extend the entire longitudinal length of an associated one of the cylindrical portions 52 and 53 such that it protrudes outward (in a diametrical direction). Note that the let-off protrusions 52*c* and 53*c* are formed such that they protrude relative to portions therearound which are formed to be recessed.

Figure 12:
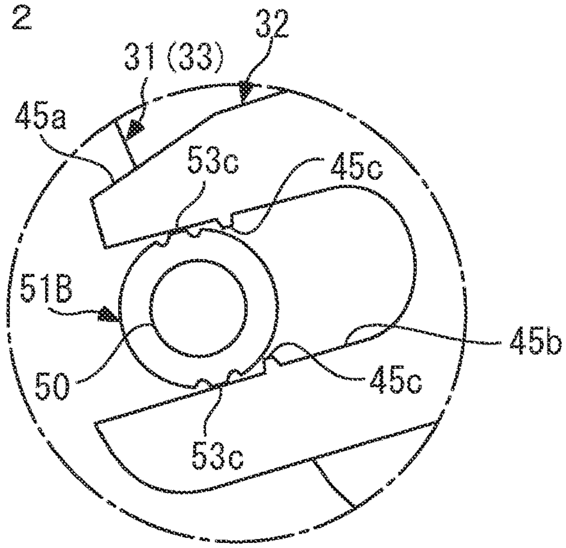
FIG. 12 is a view showing a connected state of a connecting shaft of the first arm having the cushioning member shown in FIGS. 11A and 11B mounted thereon, and connecting recesses of the second arm.

FIG. 12 shows a state in which the connecting shaft 50 of the first arm 31 having the above-described cushioning member 51B mounted thereon are connected to the connecting recesses 45*b* of the second arm 32. As shown in FIG. 12, two let-off protrusions 45*c* and 45*c* are formed on the connecting recess 45*b* of each connecting portion 45*a* of the second arm 32, at upper and lower predetermined locations of the inner surface of the connecting recess 45*b*. Each let-off protrusion 45*c* is formed such that it protrudes a predetermined length from the inner surface of the connecting recess 45*b*.

Figure 13A:
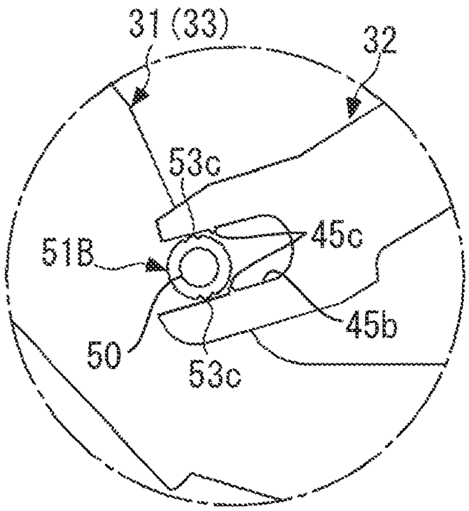
Figure 13B:
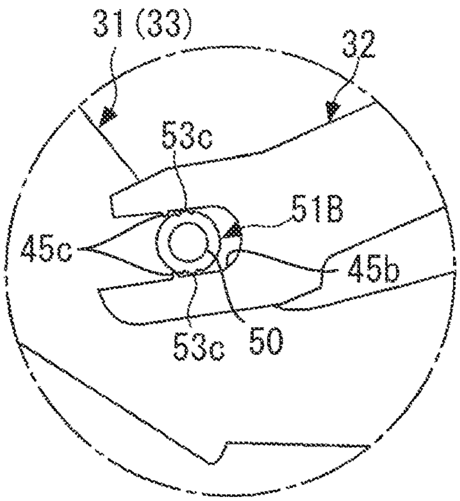

FIGS. 13A and 13B are views similar to FIG. 12 referred to hereinabove. FIG. 13A shows a key-released state and FIG. 13B shows a key-depressed state. As shown in FIG. 13A, in the key-released state, the let-off protrusions 53*c* and 53*c* of the cushioning member 51B are positioned forward of the let-off protrusions 45*c* and 45*c* of the engagement recesses 45*b* of the second arm 32. When the key 2 is depressed from this state, the first arm 31 is pivotally moved, as described hereinabove, in the counterclockwise direction, and the second arm 32 is pivotally moved in the clockwise direction, whereby the cushioning member 51B integrally mounted on the connecting shaft 50 slides toward an inner side (right side as viewed in FIG. 13A) of the engagement recesses 45*b*. In this case, each let-off protrusion 53*c* of the cushioning member 51B is brought into contact with each let-off protrusion 45*c* of the engagement recesses 45*b* from the front side, and is, immediately after the contact, moved rearward (see FIG. 13B).

As described above, each let-off protrusion 53*c* of the cushioning member 51B is temporarily brought into contact with the let-off protrusion 45*c* of the associated engagement recess 45*b*, whereby upon key depression, as the connecting shaft 50 of the first arm 31 is slid inside the engagement recesses 45*b* of the second arm 32, the sliding is temporarily hindered. With this, click feeling due to temporary resistance is generated on the depressed key 2, whereby it is possible to obtain touch feeling analogous to let-off of an acoustic piano.

Next, the essential part of the second aspect of the present invention will be described with reference to FIGS. 14A to 19B. The essential part of the second aspect of the present invention is that each second pivot shaft 19*a* (pivot shaft) of the keyboard chassis 4 is formed such that it has a predetermined shape in cross-section, and the bearing portion 41 is formed such that it has a predetermined shape and size so as to enable the second arm 32 to be easily engaged with and disengaged from the second pivot shaft 19*a* at the time of assembly or maintenance of the keyboard device 1.

Figure 14A:
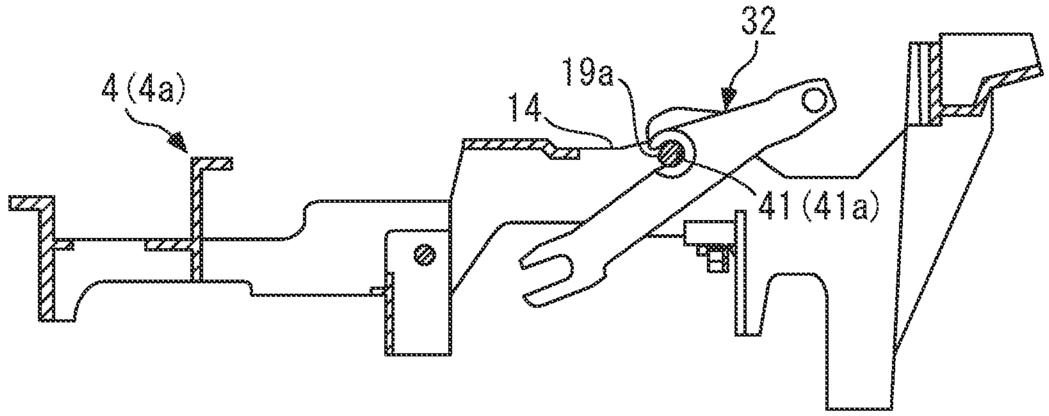
Figure 14B:
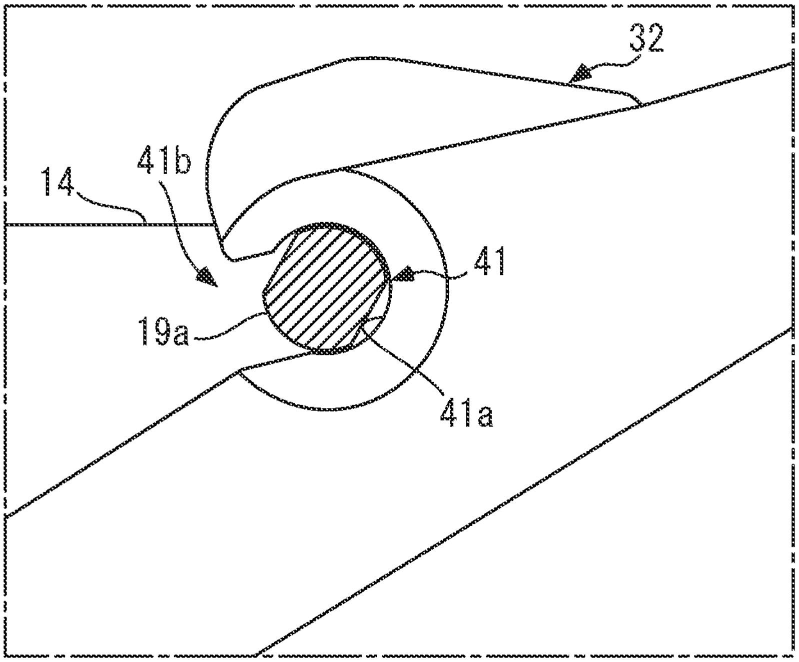

FIG. 14A shows a state in which the second arm 32 is supported on an associated one of the second pivot shafts 19*a* of the keyboard chassis 4, and FIG. 14B shows the second pivot shaft 19*a* and components therearound on an enlarged scale. FIGS. 14A and 14B show the posture of the second arm 32 and the positional relationship between the bearing portion 41 and the second pivot shaft 19*a* in a state in which the key 2 is not depressed (in the key-released state).

Figure 15A:
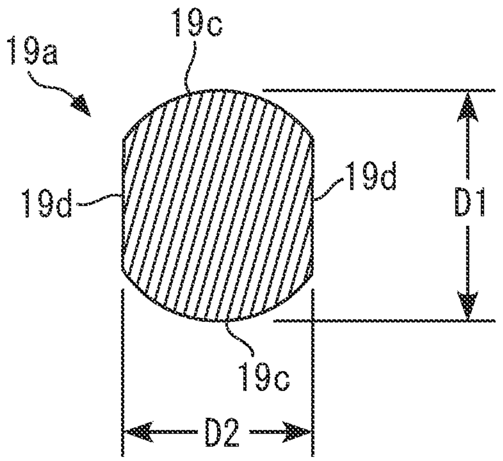

FIG. 15A shows the second pivot shaft 19*a* on an enlarged scale. As shown in FIG. 15A, the second pivot shaft 19*a* has a cross-section in a so-called oval shape in which two portions of a circle, the center of which corresponds to the shaft axis of the second pivot shaft 19*a*, are cut out. An outer peripheral surface of the second pivot shaft 19*a* is formed by a pair of curved surfaces 19*c* and 19*c* which are formed in an arcuate shape convex outward and are opposed to each other with a predetermined spacing therebetween, and a pair of planar surfaces 19*d* and 19*d* which have ends continuous with ends of the pair of curved surfaces 19*c* and 19*c* and are parallelly opposed to each other with a predetermined spacing therebetween. Further, in the second pivot shaft 19*a*, a distance D1 between respective vertices of the pair of curved surfaces 19*c* and 19*c* is set to a value larger than a distance D2 between the pair of planar surfaces 19*d* and 19*d*.

Figure 15B:
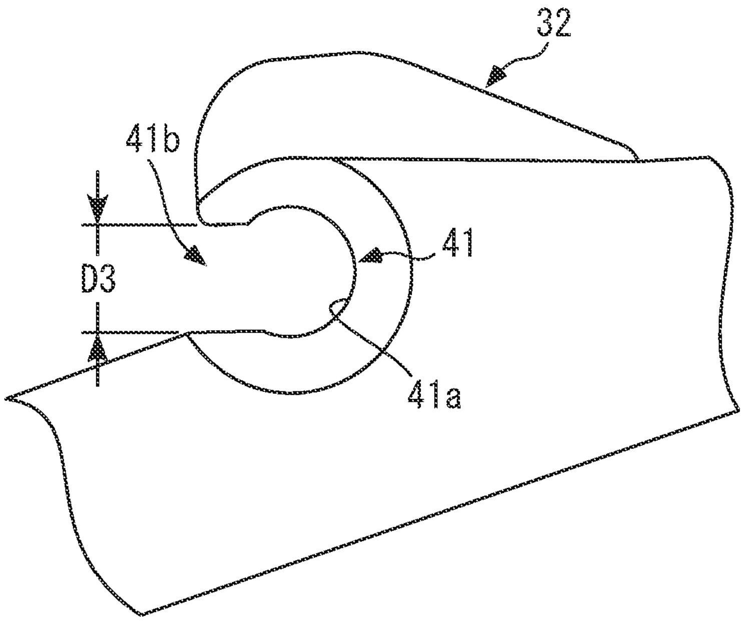

On the other hand, as shown in FIG. 15B, the bearing portion 41 of the second arm 32 includes an inner peripheral surface 41*a* having an arcuate shape in side view, and an opening 41*b* open toward a front end of the second arm 32. A diameter of the above-mentioned inner peripheral surface 41*a* is set to a value approximately equal to the distance D1 between the vertices of the pair of curved surfaces 19*c* and 19*c* of the second pivot shaft 19*a*. That is, the inner peripheral surface 41*a* of the bearing portion 41 has approximately the same curvature as each curved surface 19*c* of the second pivot shaft 19*a*. Further, an opening dimension D3 of the opening 41*b* of the bearing portion 41 is slightly larger than the distance D2 between the pair of planar surfaces 19*d* and 19*d* of the second pivot shaft 19*a*, and is set to a value smaller than the distance D1 between the pair of curved surfaces 19*c* and 19*c* (D2<D3<D1).

Figure 16A:
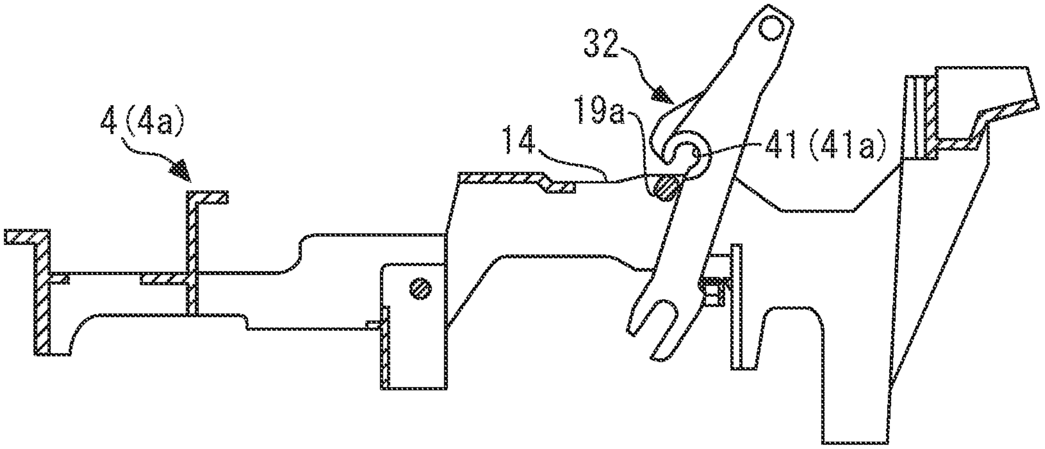
Figure 16B:
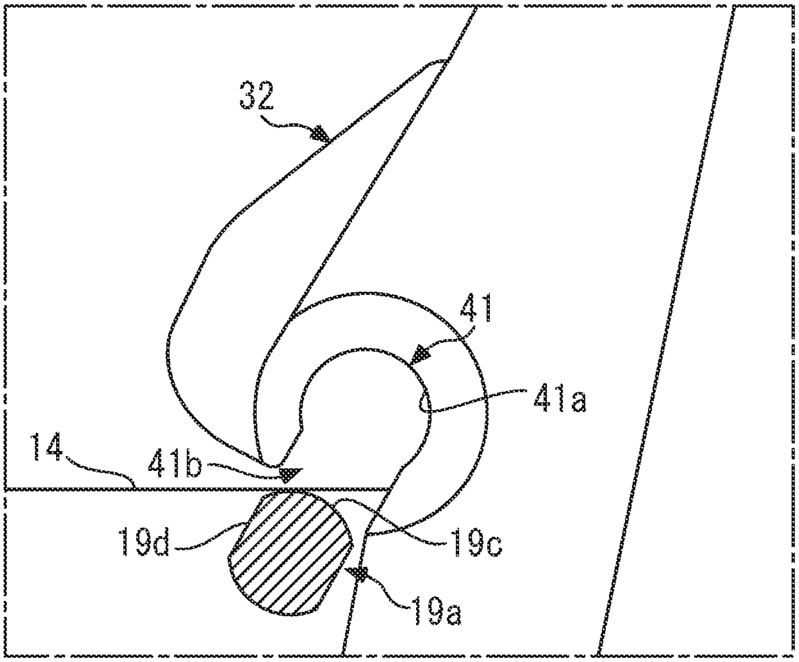

FIGS. 16A and 16B show a state immediately before the second arm 32 is mounted on the second pivot shaft 19*a* of the keyboard chassis 4 e.g. at the time of assembly of the keyboard device 1. As shown in FIGS. 16A and 16B, when the second arm 32 is mounted on the second pivot shaft 19*a*, first, the second arm 32 is held in a forwardly downward inclined posture as shown in FIG. 16A such that the opening 41*b* of the bearing portion 41 faces toward an upper one of the curved surfaces 19*c* of the second pivot shaft 19*a*. Then, the bearing portion 41 is brought closer to the second pivot shaft 19*a* for engagement therewith. As described above, since the opening dimension D3 of the opening 41*b* of the bearing portion 41 is larger than the distance D2 between the pair of planar surfaces 19*d* and 19*d* of the second pivot shaft 19*a*, the second pivot shaft 19*a* passes through the opening 41*b* and is fitted in the bearing portion 41. Thus, the second arm 32 can be easily mounted on the second pivot shaft 19*a* via the bearing portion 41 from above the keyboard chassis 4.

On the other hand, e.g. at the time of maintenance of the keyboard device 1, to remove the second arm 32 mounted on the second pivot shaft 19*a* from the second pivot shaft 19*a*, first, the second arm 32 is held in the same forwardly downward inclined posture as in FIG. 16A, whereby the opening 41*b* of the bearing portion 41 is adjusted to the curved surface 19*c* of the second pivot shaft 19*a*. Then, the second arm 32 is pulled upward of the keyboard chassis 4. This causes the second pivot shaft 19*a* to pass through the opening 41*b* and be removed from the bearing portion 41. As described above, the second arm 32 mounted on the second pivot shaft 19*a* via the bearing portion 41 can be easily removed upward of the keyboard chassis 4.

Figure 17A:
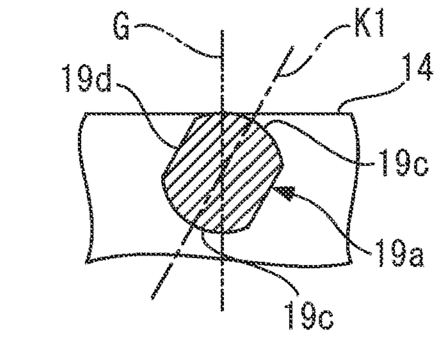
FIG. 17A is a cross-sectional view of the second pivot shaft.
Figure 17B:
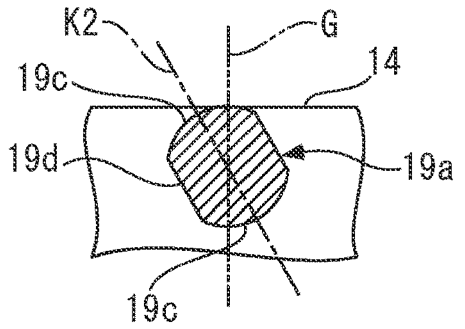
FIG. 17B is a cross-sectional view of the second pivot shaft in a state inclined forward.

Further, although the above-described second pivot shaft 19*a* is set such that a long axis thereof, which passes through its support axis and extends along a direction in which the pair of curved surfaces 19*c* and 19*c* are opposed to each other, is inclined rearward with respect to a vertical line, by way of example, the second pivot shaft 19*a* can also be set such that the long axis thereof is inclined forward with respect to the vertical line. FIG. 17A shows the above-described second pivot shaft 19*a*, and the long axis of this second pivot shaft 19*a* extends along an axis K1 inclined rearward (rightward in FIG. 17A) with respect to the vertical line, denoted by symbol G. On the other hand, a long axis of a second pivot shaft 19*a* shown in FIG. 17B extends along an axis K2 inclined forward with respect to the vertical line G.

Figure 18A:
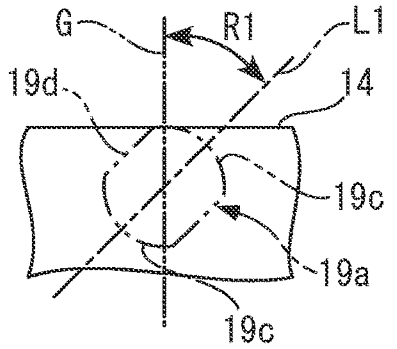
Figure 18B:
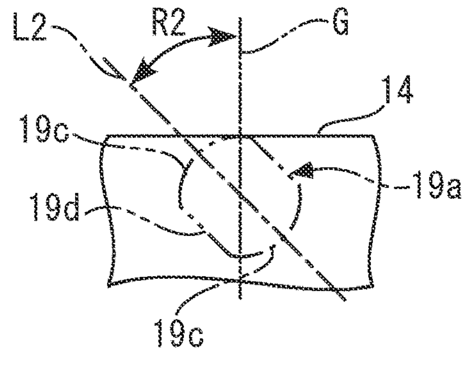

Further, an inclination angle of the long axis of the second pivot shaft 19*a* with respect to the vertical line is only required to be within a predetermined range, as shown in FIGS. 18A and 18B. A second pivot shaft 19*a* shown in FIG. 18A is set such that a long axis thereof extends along an axis L1 (rear-side inclined axis) inclined rearward through a predetermined angle R1 (e.g. 45 degrees) with respect to the vertical line G. On the other hand, a second pivot shaft 19*a* shown in FIG. 18B is set such that a long axis thereof extends along an axis L2 (front-side inclined axis) inclined forward through a predetermined angle R2 (e.g. 45 degrees) with respect to the vertical line G. That is, the inclination angle of the long axis of the second pivot shaft 19*a* is only required to be within a range of 45 degrees forward/rearward with respect to the vertical line G. By setting the inclination angle of the long axis of the second pivot shaft 19*a* within the above-mentioned range, it is possible to prevent the second arm 32 from being removed from the second pivot shaft 19*a* during musical performance or transport of the keyboard device 1, while ensuring easy engagement and disengagement of the second arm 32 with and from the second pivot shaft 19*a* during assembly or maintenance of the keyboard device 1.

Figure 19A:
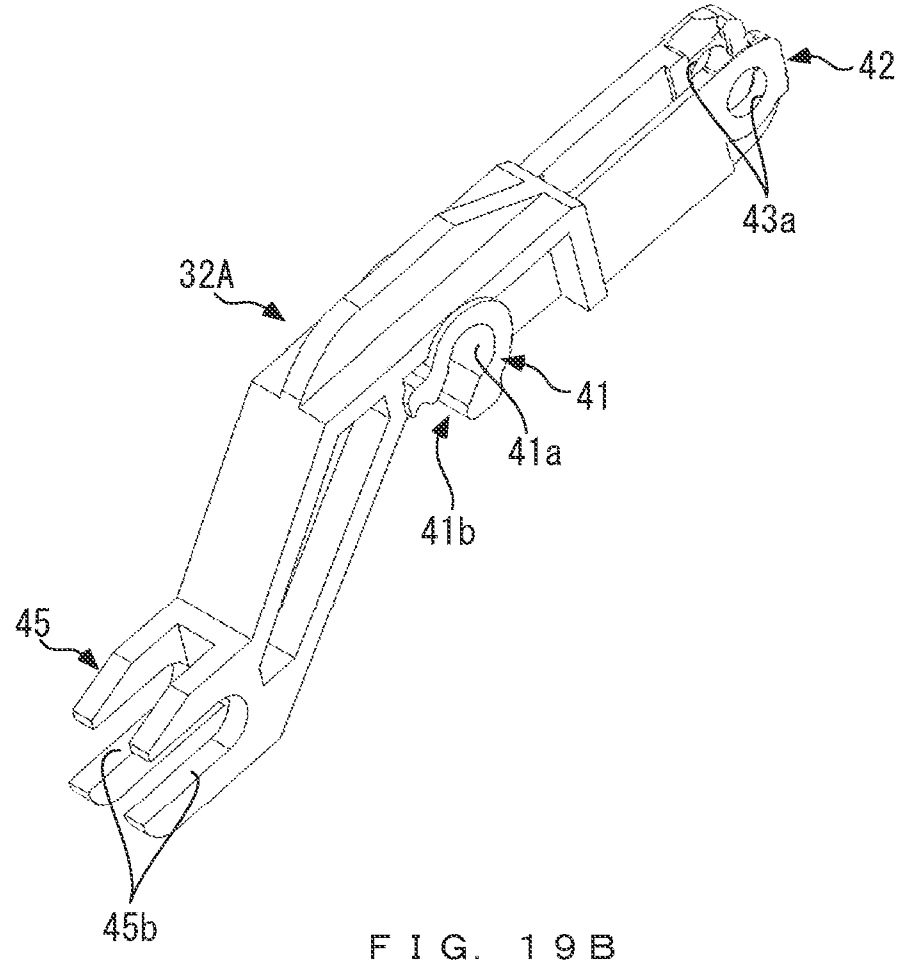
FIGS. 19A and 19B are a perspective view and a right side view of a variation of the second arm, respectively.
Figure 19B:
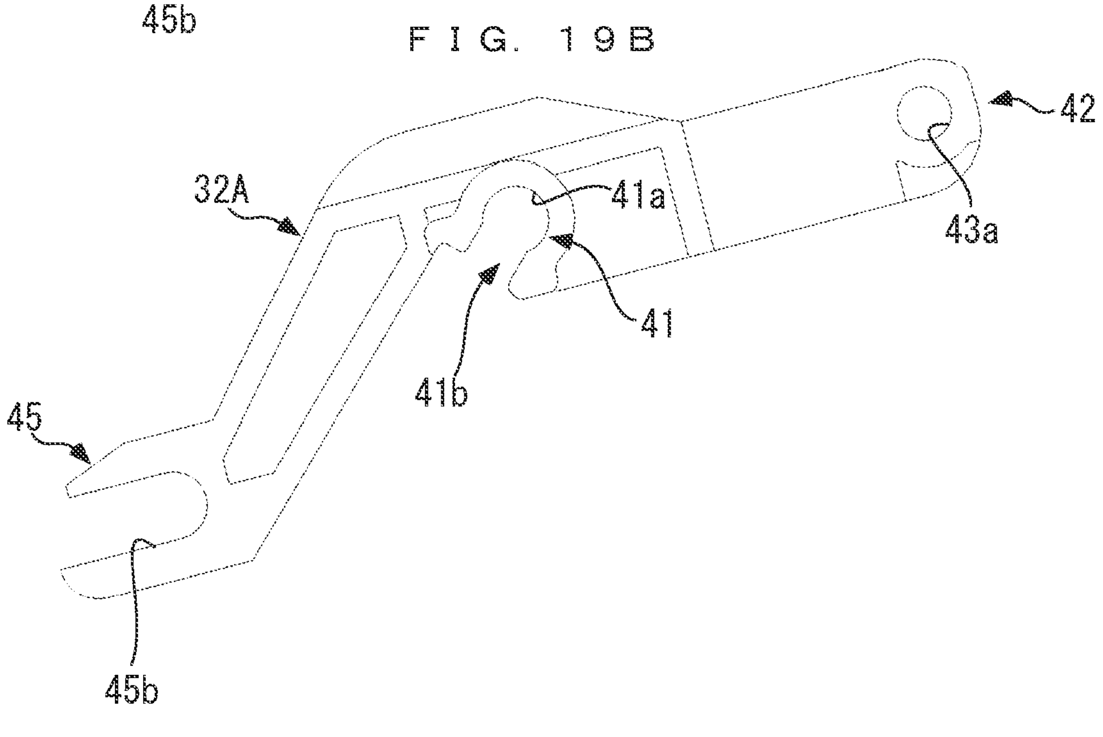

FIGS. 19A and 19B are views of a variation of the second arm. FIG. 19A is a perspective view, and FIG. 19B is a right side view. A second arm, denoted by reference numeral 32A, shown in FIGS. 19A and 19B, has a predetermined shape in which the second arm 32 is bent downward from a longitudinal center thereof. Further, inside a bent portion of the second arm 32A, the bearing portion 41 is formed which includes the inner peripheral surface 41*a* and the opening 41*b* similar to those of the above-described second arm 32. Note that similar to the above-described second arm 32, the above-mentioned second arm 32A has a front end thereof formed with the second arm front-side connecting portion 45 including the connecting recesses 45*b*, and a rear end thereof formed with the second arm rear-side connecting portion 42 including the connecting holes 43*a*.

In the second arm 32A constructed as described above, e.g. when a longitudinal center or its vicinity of the key 2 is depressed for key depression, a depressing load sometimes acts from above on the second arm front-side connecting portion 45 formed at the front end of the second arm 32A and the second arm rear-side connecting portion 42 formed at the rear end thereof. In this case, the second arm 32A is liable to be deformed in a direction in which the opening 41*b* of the bearing portion 41 is narrowed, so that it is possible to positively prevent the second arm 32A from being removed from the second pivot shaft 19*a*. Note that the overall strength of the second arm 32A can be increased by the shape thereof.

Note that the present invention is not limited to the above-described embodiments, but it can be practiced in various forms. For example, although in the above-described embodiments, the first arm rear-side connecting portion 37 of the first arm 31 is provided with the connecting shaft 50, and on the other hand, the second arm front-side connecting portion 45 of the second arm 32 is provided with the engagement recesses 45*b*, it is also possible to reverse the positional relationship between the connecting shaft 50 and the engagement recesses 45*b*, which are engaged with each other, that is, it is possible to form the connecting shaft on the second arm 32 and the engagement recesses in the first arm 31. Note that in this case, the engagement recesses formed in the first arm 31 are formed such that they are open rearward.

Further, although in the above-described embodiments, the cushioning member 51B and the engagement recesses 45*b* of the second arm 32 are provided with the let-off protrusions 52*c*, 53*c* and 45*c*, the shapes and the number of the let-off protrusions are not particularly limited, but insofar it is possible to add let-off feeling to touch feeling of a depressed key, only one of the cushioning member 51B and the engagement recesses 45*b* of the second arm 32 may be provided with let-off protrusions.

Furthermore, although in the above-described embodiment to which the essential part of the first aspect of the present invention is applied, the description has been given based on the key support mechanism 6*a* supporting the white key 2*a*, as a matter of course, the present invention can also be applied to the key support mechanism 6*b* for the black key 2*b*. Further, details of the construction of the cushioning member 51 shown in the embodiment are given only by way of example, and they can be changed as appropriate within the scope of the subject matter of the present invention.

According to the keyboard device 1 to which the essential part of the second aspect of the present invention is applied, during assembly or maintenance of the keyboard device 1, the second arm 32 can be easily engaged with and disengaged from the second pivot shaft 19*a* of the keyboard chassis 4. This makes it possible to efficiently perform assembly and maintenance work of the keyboard device 1.

Note that the present invention is not limited to the above-described embodiment, but it can be practiced in various forms. For example, although in the above-described embodiment, the arm of the present invention is applied to the second arm 32 of the key support mechanism 6, the present invention is not limited to this, but it can also be applied to the first arm 31.

Further, details of the constructions of the second arm 32 and the second pivot shaft 19*a* shown in the embodiment are given only by way of example, and they can be changed as appropriate within the scope of the subject matter of the present invention.

What is claimed is:

1. A keyboard device for a keyboard instrument, including:

a keyboard chassis, a key extending a predetermined length in a front-rear direction and disposed on the keyboard chassis, and a key support mechanism engaged with the keyboard chassis and provided so as to support the key from below, the key support mechanism causing, upon depression of the key, the depressed key to operate such that the key pivotally moves about a virtual pivot located rearward of a rear end of the key, wherein the key support mechanism comprises:

a first arm configured to extend a predetermined length in the front-rear direction and be swingably engaged with a first pivot shaft provided on the keyboard chassis, the first arm having a front end pivotally and slidably connected to a front portion of the key; and a second arm configured to extend a predetermined length in the front-rear direction and be swingably engaged with a second pivot shaft provided on the keyboard chassis at a location rearward of the first pivot shaft, the second arm having a rear end pivotally connected to a rear portion of the key, and including a second arm front-side connecting portion which is disposed forward of the second pivot shaft and is pivotally and slidably connected to a first arm rear-side connecting portion rearward of the first pivot shaft of the first arm, wherein one of the first arm rear-side connecting portion and the second arm front-side connecting portion includes an engagement shaft extending in a left-right direction, wherein the other of the first arm rear-side connecting portion and the second arm front-side connecting portion includes an engagement recess engaged with the engagement shaft, and wherein a cushioning member in sliding contact with an inner surface of the engagement recess is mounted on the engagement shaft in a state covering an outer peripheral surface of the engagement shaft.

2. The keyboard device according to claim 1, wherein the engagement shaft is formed by a left protrusion and a right protrusion protruding toward a left side and a right side, respectively, wherein the cushioning member is formed as a molded article made of an elastic synthetic resin, the cushioning member including:

a left cylindrical portion which is formed in a hollow cylindrical shape and into which the left protrusion is fitted, a right cylindrical portion which is formed in a hollow cylindrical shape and into which the right protrusion is fitted, and a connecting portion provided such that the connecting portion connects a right-side end surface of the left cylindrical portion and a left-side end surface of the right cylindrical portion.

3. The keyboard device according to claim 2, wherein lubricant holding portions each formed in a concave shape open outward for holding a lubricant are formed in respective outer peripheral surfaces of the left cylindrical portion and the right cylindrical portion.

4. The keyboard device according to claim 2, wherein at least one of the left cylindrical portion and the right cylindrical portion includes a cutoff portion formed by cutting off the cylindrical portion along a longitudinal direction thereof.

5. The keyboard device according to claim 1, wherein at least one of the inner surface of the engagement recess and an outer peripheral surface of the cushioning member is provided with a let-off protrusion formed in a protruding shape protruding outward, the let-off protrusion temporarily hindering sliding of the engagement shaft inside the engagement recess caused by key depression, for adding let-off feeling to touch feeling of the depressed key.

6. A keyboard device for a keyboard instrument, including:

a keyboard chassis, a key extending a predetermined length in a front-rear direction and disposed on the keyboard chassis, and a key support mechanism engaged with the keyboard chassis and provided so as to support the key from below, the key support mechanism causing, upon depression of the key, the depressed key to operate such that the key pivotally moves about a virtual pivot located rearward of a rear end of the key, wherein the key support mechanism comprises an arm configured to extend a predetermined length in the front-rear direction, the arm being pivotally engaged with a pivot shaft provided on the keyboard chassis and extending in the left-right direction, and having one end engaged with the key, and wherein the arm includes a bearing portion via which, when the arm is engaged with and disengaged from the pivot shaft during assembly or maintenance of the keyboard device, the arm can be mounted on the pivot shaft from above the keyboard chassis and can be removed from the pivot shaft upward of the keyboard chassis, while being held in a predetermined posture.

7. The keyboard device according to claim 6, wherein an outer peripheral surface of the pivot shaft comprises:

a pair of curved surfaces formed in an arcuate shape convex outward and opposed to each other with a predetermined spacing therebetween, and a pair of planar surfaces having ends continuous with ends of the pair of curved surfaces and parallelly opposed to each other with a predetermined spacing therebetween which is shorter than a distance between the pair of curved surfaces, wherein the bearing portion has an opening open toward a front end of the arm, and wherein an opening dimension of the opening is set to be shorter than a distance between respective vertices of the pair of curved surfaces and longer than a distance between the pair of planar surfaces.

8. The keyboard device according to claim 7, wherein the pivot shaft is set such that a long axis thereof, which passes through a shaft axis thereof and extends along a direction in which the pair of curved surfaces are opposed to each other, is positioned between a front-side inclined axis inclined forward through a predetermined angle with respect to a vertical line and a rear-side inclined axis inclined rearward through a predetermined angle with respect to the vertical line.

9. The keyboard device according to claim 8, wherein the predetermined angle is 45 degrees.

10. The keyboard device according to claim 7, wherein the bearing portion is provided at about a longitudinal center of the arm and at an upper portion of the arm.

* * * * *